(12) United States Patent
Zhang et al.

(10) Patent No.: US 9,642,045 B2
(45) Date of Patent: May 2, 2017

(54) METHOD AND DEVICE FOR RELEASING CONTEXT-RELATED RESOURCE OF USER EQUIPMENT

(71) Applicant: Huawei Technologies Co., LTD, Shenzhen (CN)

(72) Inventors: Tao Zhang, Beijing (CN); Bo Lin, Beijing (CN); Zheng Zhou, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 600 days.

(21) Appl. No.: 13/934,731

(22) Filed: Jul. 3, 2013

(65) Prior Publication Data

US 2013/0295936 A1 Nov. 7, 2013

Related U.S. Application Data

(63) Continuation of application No. PCT/CN2012/070192, filed on Jan. 10, 2012.

(30) Foreign Application Priority Data

Jan. 10, 2011 (CN) .......................... 2011 1 0004406

(51) Int. Cl.
*H04W 4/20* (2009.01)
*H04W 36/00* (2009.01)
*H04W 76/06* (2009.01)

(52) U.S. Cl.
CPC ....... *H04W 36/0033* (2013.01); *H04W 76/06* (2013.01)

(58) Field of Classification Search
CPC ........... H04W 84/045; H04W 36/0055; H04W 36/0005; H04W 36/0033; H04W 36/08; H04W 88/16; H04W 76/06; H04W 36/245; H04W 60/00; H04W 76/064;
(Continued)

(56) References Cited

U.S. PATENT DOCUMENTS

2009/0274122 A1 11/2009 Wu
2009/0285183 A1 11/2009 Wu et al.
(Continued)

FOREIGN PATENT DOCUMENTS

CN 1627756 A 6/2005
CN 1708141 A 12/2005
(Continued)

OTHER PUBLICATIONS

Huawei, "Discussion on UE context release in the source HeNB Gw for X2 mobility," 3GPP TSG RAN WG3 #70b meeting, R3-110107, Dublin, Ireland, Jan. 17-21, 2011, 4 pages.
(Continued)

*Primary Examiner* — Quan M Hua
(74) *Attorney, Agent, or Firm* — Slater Matsil, LLP

(57) ABSTRACT

In a method for releasing the context-related resource of the user equipment includes a source intermediate node receives a control message. The control message carries an identifier of a user equipment handed over to a target access network node. The source intermediate node releases a context-related resource of the user equipment corresponding to the identifier of the user equipment.

15 Claims, 10 Drawing Sheets

(58) Field of Classification Search
CPC . H04W 92/045; H04W 92/12; H04W 76/025; H04W 76/041; H04W 8/02; H04W 24/02
See application file for complete search history.

(56) References Cited

U.S. PATENT DOCUMENTS

| | | | |
|---|---|---|---|
| 2010/0150049 A1* | 6/2010 | Kim | H04W 76/022 370/312 |
| 2010/0303039 A1* | 12/2010 | Zhang | H04L 5/0035 370/331 |
| 2011/0077010 A1* | 3/2011 | Xu | H04W 36/0033 455/437 |
| 2011/0182244 A1* | 7/2011 | Liang | H04W 8/082 370/328 |
| 2012/0002659 A1 | 1/2012 | Kawaguchi | |
| 2012/0034919 A1 | 2/2012 | Nakata et al. | |
| 2013/0150037 A1 | 6/2013 | Jha | |
| 2013/0315206 A1 | 11/2013 | Hapsari et al. | |

FOREIGN PATENT DOCUMENTS

| | | |
|---|---|---|
| CN | 101330753 A | 12/2008 |
| CN | 101478795 A | 7/2009 |
| CN | 101686563 A | 3/2010 |
| EP | 2104278 A1 | 9/2009 |
| EP | 2117240 A1 | 11/2009 |
| EP | 2184935 A1 | 5/2010 |
| EP | 2237587 A1 | 10/2010 |
| JP | 2008172294 A | 7/2008 |
| JP | 2009232390 A | 10/2009 |
| JP | 2010258922 A | 11/2010 |
| JP | 2013541232 A | 11/2013 |
| KR | 10-2004-0066762 A | 7/2004 |
| WO | 2009078508 A1 | 6/2009 |
| WO | 2009096121 A1 | 8/2009 |
| WO | 2010059100 A1 | 5/2010 |
| WO | 2010122712 A1 | 10/2010 |
| WO | 2010122842 A1 | 10/2010 |

OTHER PUBLICATIONS

Huawei, et al., "Further consideration on the UE context release in the source HeNB GW after X2 handover," 3GPP TSG RAN WG3 #71 meeting, R3-110627, Feb. 21-25, 2011, 4 pages.
Nokia Siemens Networks, "Support of Intra-HNB-GW-Inter-HNB Mobility Procedures Using RNSAP," 3GPP TSG RAN WG3 Meeting #70, R3-103540, Nov. 15-19, 2010, 62 pages.
Samsung, "PGW Resource Release Problem Upon CN Relocation Failure in X2 HO with SGW Relocation Procedure," 3GPP TSG SA WG2 Meeting #75E (Electronic), TD S2-096197, Aug. 21-Oct. 28, 2009, 3 pages.
Vodafone et al., "Bearer Admission Control Within the Femto Architecture," 3GPP TSG SA WG2 Meeting #82, TD S2-105925, Nov. 15-19, 2010, 17 pages.
Chinese Office Action received in Application No. 201110004406.3 mailed Jan. 26, 2014, 6 pages.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), 3GPP TS 36.300, V9.6.0, Dec. 2010, 173 pages.
3rd Generation Partnership Project; Technical Specification Group Radio Access Network; Evolved Universal Terrestrial Radio Access Network (E-UTRAN); S1 Application Protocol (S1AP) (Release 10), 3GPP TS 36.413, V10.0.1, Jan. 2011, 250 pages.
International Search Report received in Application No. PCT/CN2012/070192 mailed Apr. 5, 2012, 9 pages.
Written Opinion received in Application No. PCT/CN2012/070192 mailed Apr. 5, 2012, 26 pages.
Alcatel-Lucent, "Introduction of inter-HeNB Enhanced Mobility Procedure." 3GPP TSG-RAN WG3 Meeting #70, R3-103470, Version 10-1-0, Nov. 15-19, 2010.

* cited by examiner

METHOD AND DEVICE FOR RELEASING CONTEXT-RELATED RESOURCE OF USER EQUIPMENT

CROSS-REFERENCE TO RELATED APPLICATIONS

This application is a continuation of International Application No PCT/CN2012/070192, filed on Jan. 10, 2012, which claims priority to Chinese Patent Application No. 201110004406.3, filed on Jan. 10, 2011, both of which are hereby incorporated by reference in their entireties.

TECHNICAL FIELD

The present invention relates to the field of wireless communications technologies, and in particular, to a method and device for releasing a context-related resource of a user equipment.

BACKGROUND

For a wireless communications network, a common network architecture is formed by a radio access network and a core network, and the radio access network and the core network are connected through an interface. The radio access network is connected to an accessing terminal through a radio interface and provides a service for the terminal.

With the development of a technology, a new network architecture appears, that is, an intermediate node is introduced between an access network node and a core network node. The intermediate node serves as a proxy node between the access network node and the core network node: from the perspective of a core network, the intermediate node functions as an access network node; and from the perspective of an access network node, the intermediate node functions as a core network node.

A long term evolution (Long Term Evolution, hereinafter referred to as LTE) system is used as an example. In the LTE system, some base stations (enhanced NodeB, hereinafter referred to as eNB) are connected to a mobility management entity (Mobility Management Entity, hereinafter referred to as MME) through a gateway (Gateway, hereinafter referred to as GW), but some eNBs are directly connected to the MME. The logical interfaces between the eNB and GW, the GW and MME, and the eNB and MME are the same, and are all S1 interfaces; a directly connected logical interface may exist between eNBs, called an X2 interface. Compared with an S1 interface, a user equipment (User Equipment, hereinafter referred to as UE) may be handed over more quickly from a source eNB to a target eNB through the X2 interface. The handover performed through the X2 interface is called X2 handover.

The eNB may be a common macro base station or a small base station, including a home base station (Home enhanced NodeB, hereinafter referred to as HeNB and Home NodeB, hereinafter referred to as HNB) or a relay node (relay node, hereinafter referred to as RN).

Based on the topology relationship between the source eNB and the target eNB, X2 handover may be classified into the following five cases:
(1) The source eNB and the target eNB are connected to the same GW;
(2) The source eNB is connected to the GW, and the target eNB is connected to the MME;
(3) The source eNB is connected to the MME, and the target eNB is connected to the GW;
(4) The source eNB is connected to a GW, and the target eNB is connected to another GW; and
(5) Both the source eNB and the target eNB are connected to the MME.

In the prior art, in any of the preceding cases, the target eNB sends a UE context release message to the source eNB through the X2 interface after X2 handover. After receiving the UE context release message, the source eNB releases a context-related resource of a UE handed over to the target eNB, where the context-related resource includes all the resources used by the UE on user and control planes in the source eNB.

However, compared with cases (1), (3), and (5), the source GW in cases (2) and (4) also has the context-related resource of the UE handed over to the target eNB. If the scheme of releasing the context of a UE provided in the prior art is used, the source GW does not find that the UE has moved out of the management scope of the source GW during and after X2 handover. As a result, the context-related resource of the UE in the source GW cannot be released, where the context-related resource includes all the resources used by the UE on the user and control planes in the source GW. Therefore, a new UE cannot access a network successfully, and resources are exhausted.

SUMMARY OF THE INVENTION

Embodiments of the present invention provide a method and device for releasing a context-related resource of a user equipment, to release the context-related resource of the user equipment in a source intermediate node.

An embodiment of the present invention provides a method for releasing a context-related resource of a user equipment. In this embodiment, a source intermediate node receives a control message. The control message carries an identifier of a user equipment handed over to a target access network node. The source intermediate node releases a context-related resource of the user equipment corresponding to the identifier of the user equipment.

An embodiment of the present invention further provides a method for releasing a context-related resource of a user equipment. In this embodiment, a source access network node determines that a user equipment is handed over from a source access network node to a target access network node. The source access network node sends a control message to a source intermediate node. The control message carries an identifier of the user equipment handed over to the target access network node, so that the source intermediate node releases a context-related resource of the user equipment corresponding to the identifier of the user equipment.

An embodiment of the present invention further provides a method for releasing a context-related resource of a user equipment. In this embodiment, a core network node sends a control message to a source intermediate node. The control message carries an identifier of a user equipment handed over to a target access network node, so that the source intermediate node releases a context-related resource of the user equipment corresponding to the identifier of the user equipment. The core network node receives a response sent by the source intermediate node in response to the control message.

An embodiment of the present invention further provides a method for releasing a context-related resource of a user equipment. In this embodiment, an intermediate node monitors data transmission and/or signaling transmission of a user equipment served by the intermediate node and releases a context-related resource of the user equipment whose data transmission and/or signaling transmission meets a preset condition.

An embodiment of the present invention further provides an intermediate node device. The device includes a first receiving module that is configured to receive a control message. The control message carries an identifier of a user equipment handed over to a target access network node device. A releasing module is configured to release a context-related resource of the user equipment corresponding to the identifier of the user equipment according to the identifier of the user equipment carried in the control message, where the control message.

An embodiment of the present invention further provides a source access network node device. The device includes a first determining module. This is configured to determine that a user equipment is handed over from a source access network node to a target access network node. A third sending module is configured to send a control message to a source intermediate node device after the first determining module determines that the user equipment is handed over from the source access network node to the target access network node. The control message carries an identifier of the user equipment handed over to a target access network node device, so that the source intermediate node device releases a context-related resource of the user equipment corresponding to the identifier of the user equipment.

An embodiment of the present invention further provides a core network node device. The device includes a fourth sending module that is configured to send a control message to a source intermediate node device. The control message carries an identifier of a user equipment handed over to a target access network node device, so that the source intermediate node device releases a context-related resource of the user equipment corresponding to the identifier of the user equipment. A fourth receiving module is configured to receive a response sent by the source intermediate node device in response to the control message.

An embodiment of the present invention further provides an intermediate node device. The device includes a monitoring module that is configured to monitor data transmission and/or signaling transmission of a user equipment under an intermediate node device. A resource releasing module is configured to release a context-related resource of the user equipment whose data transmission and/or signaling transmission monitored by the monitoring module meets a preset condition.

In embodiments of the present invention, after a source intermediate node receives a control message carrying an identifier of a user equipment handed over to a target access network node, the source intermediate node releases a context-related resource of the user equipment corresponding to the identifier of the user equipment; as a result, the context-related resource of the user equipment in the source intermediate node can be released, so that a new user equipment may access a network successfully, and resources are saved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more clearly, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art according to the embodiments of the present invention without creative efforts shall fall within the protection scope of the present invention.

Figure 1:
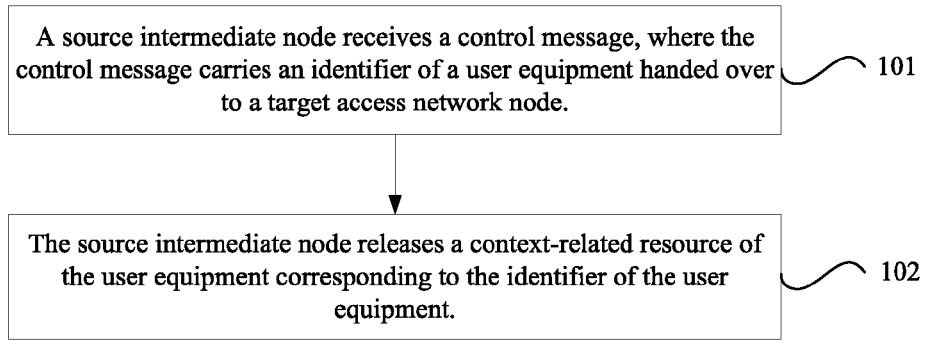
FIG. 1 is a flowchart of a method for releasing a context-related resource of a user equipment according to a first embodiment of the present invention.

FIG. 1 is a flowchart of a method for releasing a context-related resource of a user equipment according to a first embodiment of the present invention. As shown in FIG. 1, the method for releasing a context-related resource of a user equipment may include the following steps.

Step 101: A source intermediate node receives a control message, where the control message carries an identifier of a user equipment handed over to a target access network node.

Step 102: The source intermediate node releases a context-related resource of the user equipment corresponding to the identifier of the user equipment.

In an implementation manner of this embodiment, the control message may be a user equipment context release request message or reset message, and the step of receiving the control message may be receiving, by the source intermediate node, the user equipment context release request message or reset message sent by a source access network node.

Optionally, the user equipment context release request message or reset message may carry a terminating identifier, and the terminating identifier in the user equipment context release request message or reset message indicates that the source intermediate node does not need to send the user equipment context release request message to a core network node any more.

Furthermore, before releasing the context-related resource of the user equipment corresponding to the identifier of the user equipment, the source intermediate node may further send the received user equipment context release request message or reset message to the core network node, and receive a user equipment context release command message or reset acknowledgement message sent by the core network node.

Furthermore, after receiving the user equipment context release command message sent by the core network node and before releasing the context-related resource of the user equipment corresponding to the identifier of the user equipment, the source intermediate node may further send the received user equipment context release command message or reset acknowledgement message to the source access network node; then, the source intermediate node may receive the user equipment context release completion message or reset acknowledgement message sent by the source access network node.

Furthermore, after releasing the context-related resource of the user equipment corresponding to the identifier of the user equipment, the source intermediate node may further send the received user equipment context release completion message or reset acknowledgement message to the core network node.

In this implementation manner, before the source intermediate node receives the user equipment context release request message or the reset message, the source access network node may further send intermediate node information of the source access network node to the target access network node and receive intermediate node information of the target access network node sent by the target access network node. Then, the source access network node may determine that the source access network node is connected to the source intermediate node and the target access network node is connected to the target intermediate node or the core network node, according to intermediate node information of the source access network node and the intermediate node information of the target access network node. Furthermore, the source access network node may send the user equipment context release request message or the reset message to the source intermediate node.

The intermediate node information of the source access network node may include whether the source access network node is connected to an intermediate node. When the source access network node is connected to an intermediate node, the intermediate node information of the source access network node may further include the identifier of the source intermediate node connected to the source access network node. The identifier of the source intermediate node may be sent by the source intermediate node to the source access network node before the source access network node sends the intermediate node information of the source access network node to the target access network node, and the intermediate node information of the target access network node may include whether the target access network node is connected to an intermediate node. When the target access network node is connected to an intermediate node, the intermediate node information of the target access network node may further include the identifier of the target intermediate node connected to the target access network node; and the identifier of the target intermediate node may be sent by the target intermediate node to the target access network node before the target access network node sends the intermediate node information of the target access network node to the source access network node.

In addition, in this implementation manner, when the access network nodes that are not connected to the same intermediate node cannot share a tracking area identifier. Before the source intermediate node receives the user equipment context release request message or the reset message, the source access network node may further send the tracking area identifier of the source access network node to a target access network node, and receive the tracking area identifier of the target access network node sent by the target access network node. Then, the source access network node may determine that the source access network node is connected to the source intermediate node and the target access network node is connected to the target intermediate node or the core network node, according to the tracking area identifier of the source access network node and the tracking area identifier of the target access network node. Furthermore, the source access network node may send the user equipment context release command message or the reset message to the source intermediate node.

In another implementation manner of this embodiment, the control message may be a user equipment context release command message or a reset message. The step of receiving the control message may be receiving, by the source intermediate node, the user equipment context release command message or reset message sent by the core network node.

Optionally, the user equipment context release command message or the reset message may carry a terminating identifier, and the terminating identifier in the user equipment context release command message or the reset message indicates that the source intermediate node does not need to send the user equipment context release command message to the source access network node any more.

Furthermore, before releasing the context-related resource of the user equipment corresponding to the identifier of the user equipment, the source intermediate node may further send the received user equipment context release command message or reset message to the source access network node. Then, the source intermediate node may receive a user equipment context release completion message or reset acknowledgement message sent by the source access network node.

Furthermore, after releasing the context-related resource of the user equipment corresponding to the identifier of the user equipment, the source intermediate node may further send the received user equipment context release completion message or reset acknowledgement message to the core network node.

In this implementation manner, the core network node may receive and save an intermediate node identifier of the intermediate node and an intermediate node indicator corresponding to the intermediate node identifier which are sent by the intermediate node. The intermediate node indicator may indicate that the type of the node that sends the intermediate node indicator is an intermediate node. The intermediate node identifier may be an identifier such as a digit, a letter, a character string that can uniquely identify one intermediate node. The embodiment of the present invention does not limit the specific form of an intermediate node identifier. Similarly, the intermediate node indicator may be an indicator such as a digit, a letter, or a character string that can indicate the type of the node that sends the intermediate node indicator. The embodiment of the present invention does not limit the specific form of an intermediate node indicator.

At this time, the core network node may determine whether a node on a source side is a source intermediate node and a node on a target side is a target intermediate node according to the pre-obtained identifiers of the nodes on the source side and on the target side corresponding to the user equipment and the pre-obtained corresponding relation between the intermediate node indicator and intermediate node identifier. When the node on the source side is a source intermediate node, the node on the target side is a target intermediate node and the identifier of the node on the source side is different from the identifier of the node on the target side. When the node on the source side is a source intermediate node, the node on the target side is not a target intermediate node, the core network node may send the user equipment context release command message or the reset message to the source intermediate node.

Specifically, before the source intermediate node receives the user equipment context release command message or the reset message, the core network node may receive the identifier of the user equipment handed over to the target access network node. The identifier of the user equipment is sent by the target access network node. The core network node may receive a path switch request sent by the node on the target side corresponding to the user equipment handed over to the target access network node. The identifier of the user equipment is assigned by the core network node to the user equipment when the user equipment accesses a network, and is sent by the source access network node to the target access network node during X2 handover. Then, according to the identifier of the user equipment, the core network node searches in the saved corresponding relation between the identifier of the node on the source side corresponding to the user equipment and the identifier of the user equipment to obtain the identifier of the node on the source side corresponding to the user equipment. In addition, according to the saved corresponding relation between the path for receiving the path switch request and the identifier of the node on the target side, the core network node obtains the identifier of the node on the target side corresponding to the user equipment. The nodes on the source side and on the target side corresponding to the user equipment are directly connected to the core network node.

After obtaining the identifier of the node on the source side corresponding to the user equipment, the core network node may search, according to the identifier of the node on the source side, in intermediate node identifiers saved in the core network node. If an intermediate node identifier that is the same as the identifier of the node on the source side is found, the core network node may determine that the node on the source side is a source intermediate node according to the intermediate node indicator corresponding to the intermediate node identifier. If an intermediate node identifier that is the same as the identifier of the node on the source side is not found, the core network node may determine that the node on the source side is not a source intermediate node. Similarly, after obtaining the identifier of the node on the target side corresponding to the user equipment, the core network node may search, according to the identifier of the node on the target side, in intermediate node identifiers saved in the core network node. If an intermediate node identifier that is the same as the identifier of the node on the target side is found, the core network node may determine that the node on the target side is a target intermediate node according to the intermediate node indicator corresponding to the intermediate node identifier. If an intermediate node identifier that is the same as the identifier of the node on the target side is not found, the core network node may determine that the node on the target side is not a target intermediate node.

When the node on the source side is a source intermediate node, the node on the target side is a target intermediate node, and the identifier of the node on the source side is different from the identifier of the node on the target side. Alternatively, when the node on the source side is a source intermediate node and the node on the target side is not a target intermediate node, the core network node may send the user equipment context release command message or the reset message to the source intermediate node.

In addition, the core network node may further receive and save the intermediate node identifier and the tracking area identifier corresponding to the intermediate node identifier that are sent by the intermediate node, where the type of a node corresponding to the set to which the tracking area identifier sent by the intermediate node belongs is an intermediate node, and the intermediate node identifier uniquely identifies one intermediate node in a network. In this case, the core network node may determine whether the node on the source side is a source intermediate node and the node on the target side is a target intermediate node according to the pre-obtained identifiers of the nodes on the source side and on the target side corresponding to the user equipment and the pre-obtained corresponding relation between the tracking area identifier and the intermediate node identifier. When the node on the source side is a source intermediate node, the node on the target side is a target intermediate node, and the identifier of the node on the source side is different from the identifier of the node on the target side. When the node on the source side is a source intermediate node and the node on the target side is not a target intermediate node, the core network node may send the user equipment context release command message or the reset message to the source intermediate node device.

Specifically, before the source intermediate node receives the user equipment context release command message or the reset message, the core network node may receive the identifier of the user equipment handed over to the target access network node. The identifier of the user equipment is sent by the source access network node, and the core network node may receive the path switch request sent by the node on the target side corresponding to the user equipment handed over to the target access network node. The identifier of the user equipment is assigned by the core network node to the user equipment when the user equipment accesses a network, and is sent by the source access network node to the target access network node during X2 handover; then, according to the identifier of the user equipment, the core network node searches in the saved corresponding relation between the identifier of the node on the source side corresponding to the user equipment and the identifier of the user equipment to obtain the identifier of the node on the source side corresponding to the user equipment. In addition, the core network node obtains, according to the saved corresponding relation between the path for receiving the path switch request and the identifier of the node on the target side, the identifier of the node on the target side corresponding to the user equipment. The nodes on the source side and on the target side corresponding to the user equipment are directly connected to the core network node.

In this implementation manner, nodes of different types may be set to use different tracking area identifier sets. For example, the two types of nodes, the intermediate node and the access network node, may be set to use different tracking area identifier sets. After obtaining the identifier of the node on the source side corresponding to the user equipment, the core network node may search, according to the identifier of the node on the source side, in intermediate node identifiers saved in the core network node. If an intermediate node identifier that is the same as the identifier of the node on the source side is found, the core network node may determine that the node on the source side is a source intermediate node according to the type of a node corresponding to the set to which the tracking area identifier corresponding to the intermediate node identifier belongs. If an intermediate node identifier that is the same as the identifier of the node on the source side is not found, the core network node may determine that the node on the source side is not a source intermediate node. Similarly, after obtaining the identifier of the node on the target side corresponding to the user equipment, the core network node may search, according to the identifier of the node on the target side, in intermediate node identifiers saved in the core network node. If an intermediate node identifier that is the same as the identifier of the node on the target side is found, the core network node may determine that the node on the target side is a target intermediate node according to the type of a node corresponding to the set to which the tracking area identifier corresponding to the intermediate node identifier belongs. If an intermediate node identifier that is the same as the identifier of the node on the target side is not found, the core network node may determine that the node on the target side is not a target intermediate node.

When the node on the source side is a source intermediate node, the node on the target side is a target intermediate node, and the identifier of the node on the source side is different from the identifier of the node on the target side. When the node on the source side is a source intermediate node and the node on the target side is not a target intermediate node, the core network node may send the user equipment context release command message or the reset message to the source intermediate node.

In this embodiment, the access network node may be a node that provides an access function, for example, a base station. The base station may include an eNB. The eNB may be a common macro base station, or the eNB may be a small base station, including a HeNB/HNB or an RN. The core network node may be a node that provides a core network function, such as a mobility management entity. The intermediate node may be a node that provides a network compatibility function, such as protocol conversion, route selection, and data exchange, between the access network node and the core network node, for example, a gateway or a donor base station (Donor eNB, hereafter referred to as DeNB). However, the embodiment of the present invention does not limit the specific form of an access network node, an intermediate node, and a core network node.

An example that the control message may be a user equipment context release request message, a user equipment context release command message, or a reset message is taken for description in the embodiment. But the embodiment of the present invention is not limited thereto. The embodiment of the present invention does not limit the specific form of a control message, and the control massage may be other kind of message than a user equipment context release request message, a user equipment context release command message, or a reset message as long as the source intermediate node may release the context-related resource of the corresponding user equipment according to the identifier of the user equipment handed over to the target access network node carried in the control message.

In the embodiment, after a source intermediate node receives a control message carrying an identifier of a user equipment handed over to a target access network node, the source intermediate node releases a context-related resource of the user equipment corresponding to the identifier of the user equipment; as a result, the context-related resource of the user equipment in the source intermediate node can be released, so that a new user equipment may access a network successfully, and resources are saved.

Figure 2:
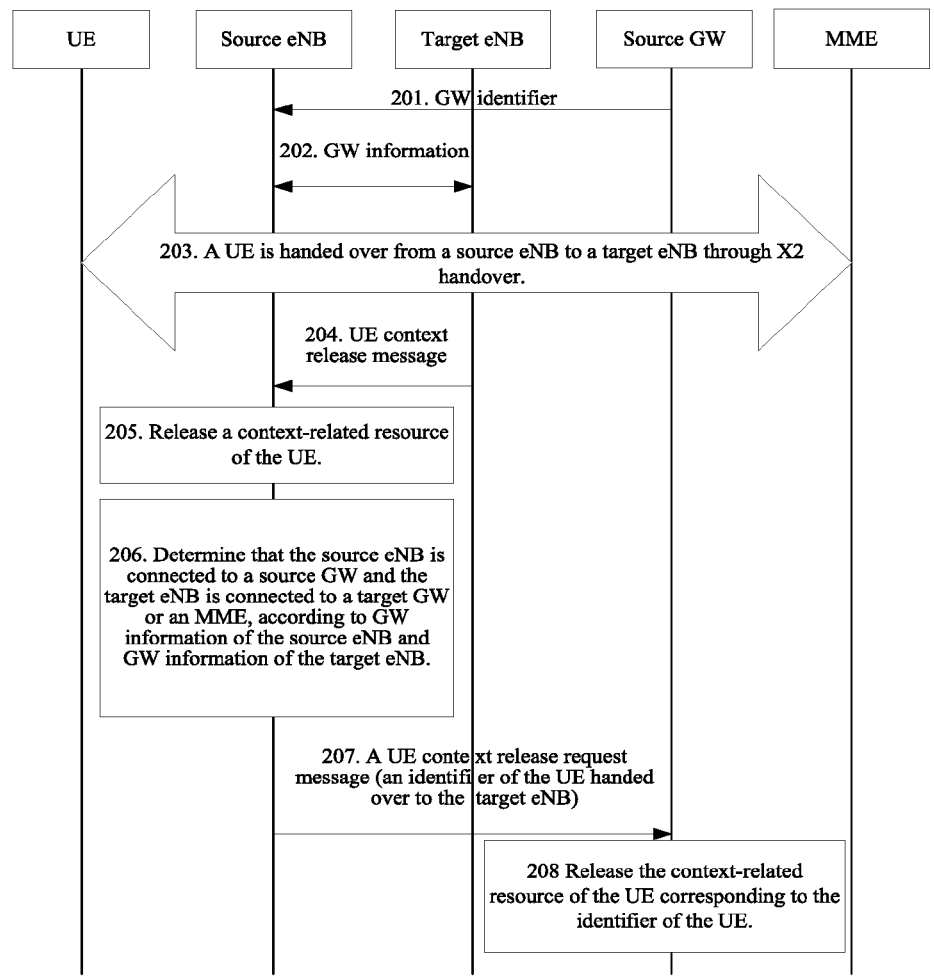
FIG. 2 is a flowchart of a method for releasing a context-related resource of a user equipment according to a second embodiment of the present invention.

FIG. 2 is a flowchart of a method for releasing a context-related resource of a user equipment according to a second embodiment of the present invention. In this embodiment, an access network node being an eNB, an intermediate node being a GW, a core network node being an MME, and a control message being a UE context release request message are used as an example for description. As shown in FIG. 2, the method for releasing the context-related resource of the user equipment may include the following steps.

Step 201: Optionally, a source GW sends a GW identifier to a source eNB.

Step 202: Optionally, the source eNB exchanges GW information with a target eNB.

Specifically, the source eNB may send the GW information of the source eNB to the target eNB and receive the GW information of the target eNB sent by the target eNB, and the GW information of the source eNB may include whether the source eNB is connected to a GW. When the source eNB is connected to a GW, the GW information of the source eNB may further include an identifier of the source GW connected to the source eNB. The GW information of the target eNB may include whether the target eNB is connected to a GW. When the target eNB is connected to a GW, the GW information of the target eNB may further include an identifier of the target GW connected to the target eNB.

Step 203: The UE is handed over from the source eNB to the target eNB through X2 handover.

Step 204: The target eNB sends a UE context release message to the source eNB.

Step 205: The source eNB releases a context-related resource of the UE.

Step 206: Optionally, the source eNB determines that the source eNB is connected to the source GW and the target eNB is connected to the target GW or the MME, according to GW information of the source eNB and GW information of the target eNB.

Step 207: The source GW receives a UE context release request message sent by the source eNB, where the UE context release request message carries an identifier of the UE handed over to the target eNB.

Optionally, the UE context release request message may further carry a terminating identifier, where the terminating identifier indicates that the source GW does not need to send the UE context release request message to the MME any more.

Step 208: The source GW releases the context-related resource of the UE corresponding to the identifier of the UE.

In addition, in this embodiment, the source eNB may also determine that the source eNB is connected to the source GW, and the target eNB is connected to the target GW or the MME, according to tracking area identifiers (Tracking Area Identifier, hereinafter referred to as TAI) of the source GW and the target GW. Specifically, it may be specified that eNBs that are not connected to the same GW cannot share a TAI. In this way, when the eNBs that are not connected to the same GW cannot share a TAI, the source eNB may send the TAI of the source eNB to the target eNB and receive the TAI of the target eNB sent by the target eNB. The source eNB may determine that the source eNB is connected to the source GW and the target eNB is connected to the target GW or the MME, according to the TAI of the source eNB and the TAI of the target eNB. Then, the source eNB may send the UE context release request message to the source GW.

In the embodiment, after receiving the UE context release request message which carries the identifier of the UE handed over to the target eNB and is sent by the source eNB, the source GW may release the context-related resource of the UE corresponding to the identifier of the UE. As a result, the context-related resource of the UE in the source GW can be released, so that a new UE may access a network successfully, and resources are saved.

Figure 3:
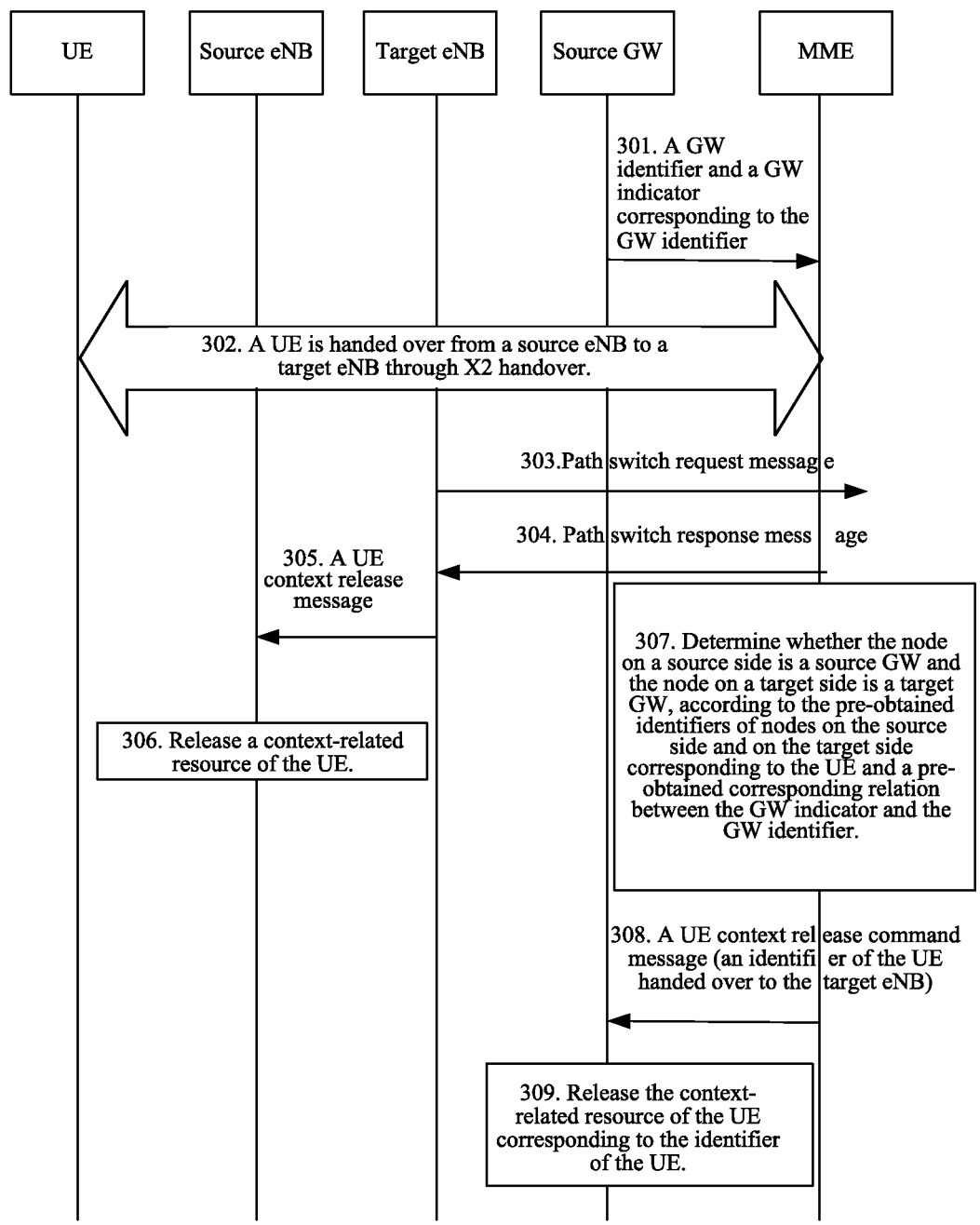
FIG. 3 is a flowchart of a method for releasing a context-related resource of a user equipment according to a third embodiment of the present invention.

FIG. 3 is a flowchart of a method for releasing a context-related resource of a user equipment according to a third embodiment of the present invention. In this embodiment, an access network node being an eNB, an intermediate node being a GW, a core network node being an MME, and a control message being a UE context release command message are used as an example for description. As shown in FIG. 3, the method for releasing the context-related resource of the user equipment may include the following steps.

Step 301: Optionally, a source GW sends a GW identifier and a GW indicator corresponding to the GW identifier to an MME. The GW indicator may indicate that the type of the node that sends the GW indicator is a GW. The GW identifier uniquely identifies one GW in a network. The GW identifier may be an identifier such as a digit, a letter, or a character string that can uniquely identify one GW. The embodiment of the present invention does not limit the specific form of a GW identifier. Similarly, the GW indicator may be an indicator such as a digit, a letter, or a character string that can indicate the type of the node that sends the GW indicator. The embodiment of the present invention does not limit the specific form of a GW indicator.

Step 302: The UE is handed over from a source eNB to a target eNB through X2 handover.

Step 303: The target eNB sends a path switch request message to the MME.

Step 304: The MME sends a path switch response message to the target eNB.

Step 305: The target eNB sends a UE context release message to the source eNB.

Step 306: The source eNB releases the context-related resource of the UE.

Step 307: Optionally, the MME determines whether a node on a source side is a source GW and a node on a target side is a target GW according to the pre-obtained identifiers of the nodes on the source side and on the target side corresponding to the UE and a pre-obtained corresponding relation between the GW indicator and the GW identifier.

Specifically, the MME may receive an identifier of the UE handed over to the target eNB, where the identifier of the UE handed over to the target eNB is sent by the target eNB, and receive the path switch request sent by the node on the target side corresponding to the UE handed over to the target eNB. The identifier of the UE is assigned by the MME to the UE when the UE accesses a network and is sent by the source eNB to the target eNB during X2 handover. Then, according to the identifier of the UE, the MME searches in the saved corresponding relation between the identifier of the UE and the identifier of the node on the source side corresponding to the UE to obtain the identifier of the node on the source side corresponding to the UE. In addition, according to the saved corresponding relation between the path for receiving the path switch request and the identifier of the node on the target side, the MME obtains the identifier of the node on the target side corresponding to the UE, where the nodes on the source side and on the target side corresponding to the UE are directly connected to the MME.

After obtaining the identifier of the node on the source side corresponding to the UE, the MME may search in GW identifiers saved in the MME, according to the identifier of the node on the source side. If a GW identifier that is the same as the identifier of the node on the source side is found, the MME may determine that the node on the source side is a source GW according to the GW indicator corresponding to the GW identifier. If a GW identifier that is the same as the identifier of the node on the source side is not found, the MME may determine that the node on the source side is not a source GW. Similarly, after obtaining the identifier of the node on the target side corresponding to the UE, the MME may search in GW identifiers saved in the MME, according to the identifier of the node on the target side. If a GW identifier that is the same as the identifier of the node on the target side is found, the MME may determine that the node on the target side is a target GW according to the GW indicator corresponding to the GW identifier; if a GW identifier that is the same as the identifier of the node on the target side is not found, the MME may determine that the node on the target side is not a target GW.

In this embodiment, step 307 may be performed after step 303. Step 307 may be performed before or after step 304, step 305, step 306 or performed in parallel with step 304, step 305, or step 306, which is not limited in this embodiment.

Step 308: The MME sends a UE context release command message to the source GW, where the UE context release command message carries the identifier of the UE handed over to the target eNB.

Specifically, when the node on the source side is a source GW, the node on the target side is a target GW, and the identifier of the node on the source side is different from the identifier of the node on the target side, or when the node on the source side is a source GW and the node on the target side is not a target GW, the MME may send the UE context release command message to the source GW.

Optionally, the UE context release command message may further carry a terminating identifier, where the terminating identifier indicates that the source GW does not need to send the UE context release command message to the source eNB any more.

Step 309: The source GW releases the context-related resource of the UE corresponding to the identifier of the UE.

In addition, in this embodiment, the MME may also determine whether the node on the source side is a source GW and the node on the target side is a target GW according to a TAI; specifically, nodes of different types may be set to use different TAI sets. Before the source GW receives the UE context release command message, the MME may receive the identifier of the UE handed over to the target eNB, where the identifier of the UE is sent by the target eNB, and receive the path switch request sent by the node on the target side corresponding to the UE handed over to the target eNB. The identifier of the UE is assigned by the MME to the UE when the UE accesses a network, and is sent by the source eNB to the target eNB during X2 handover. Then, according to the identifier of the UE, the MME searches in the saved corresponding relation between the identifier of the UE and the identifier of the node on the source side corresponding to the UE to obtain the identifier of the node on the source side corresponding to the UE. In addition, according to the saved corresponding relation between the path for receiving the path switch request and the identifier of the node on the target side, the MME obtains the identifier of the node on the target side corresponding to the UE. The nodes on the source side and on the target side corresponding to the UE are directly connected to the MME.

Nodes of different types use different TAI sets. For example, the GW and the eNB that are two types of nodes may be set to use different TAI sets. In this way, after obtaining the identifier of the node on the source side corresponding to the UE, the MME may search in GW identifiers saved in the MME, according to the identifier of the node on the source side. If a GW identifier that is the same as the identifier of the node on the source side is found, the MME may determine that the node on the source side is a source GW according to the type of a node corresponding to the set to which the TAI corresponding to the GW identifier belongs. If a GW identifier that is the same as the identifier of the node on the source side is not found, the MME may determine that the node on the source side is not a source GW. Similarly, after obtaining the identifier of the node on the target side corresponding to the UE, the MME may search in GW identifiers saved in the MME, according to the identifier of the node on the target side. If a GW identifier that is the same as the identifier of the node on the target side is found, the MME may determine that the node on the target side is a target GW according to the type of a node corresponding to the set to which the TAI corresponding to the GW identifier belongs. If a GW identifier that is the same as the identifier of the node on the target side is not found, the MME may determine that the node on the target side is not a target GW.

In the embodiment, after receiving the UE context release command message which carries the identifier of the UE handed over to the target eNB and is sent by the MME, the source GW may release the context-related resource of the UE corresponding to the identifier of the UE; as a result, the context-related resource of the UE in the source GW can be released so that a new UE may access a network successfully, resources are saved.

Figure 4:
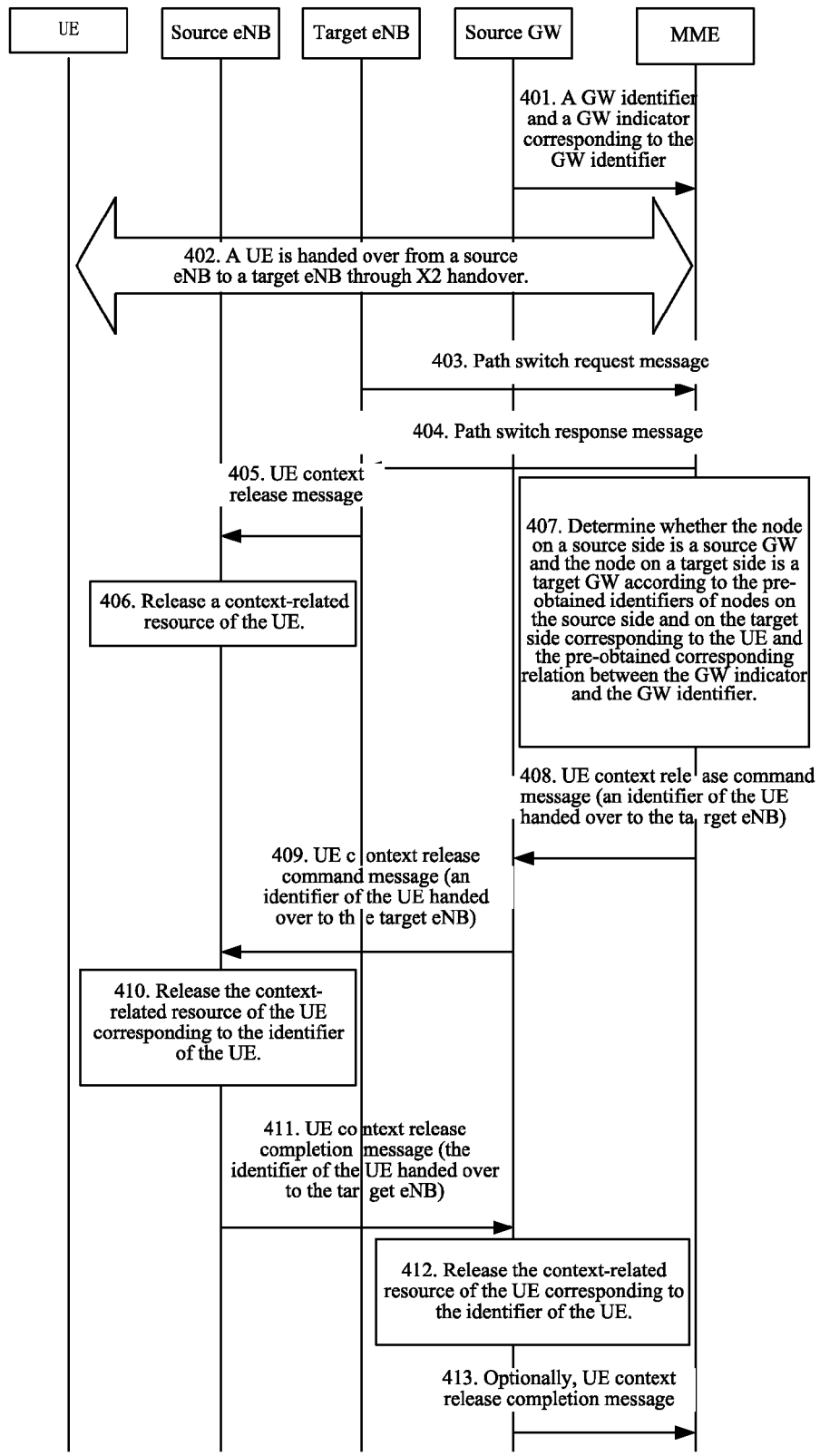
FIG. 4 is a flowchart of a method for releasing a context-related resource of a user equipment according to a fourth embodiment of the present invention.

FIG. 4 is a flowchart of a method for releasing a context-related resource of a user equipment according to a fourth embodiment of the present invention. In this embodiment, an access network node being an eNB, an intermediate node being a GW, a core network node being an MME, and a control message being a UE context release command message are used as an example for description. As shown in FIG. 4, the method for releasing the context-related resource of the user equipment may include the following steps.

Step 401: Optionally, a source GW sends a GW identifier and a GW indicator corresponding to the GW identifier to an MME. The GW indicator may indicate that the type of the node that sends the GW indicator is a GW. The GW identifier uniquely identifies one GW on a network. The GW identifier may be an identifier such as a digit, a letter, or a character string that can uniquely identify one GW. The embodiment of the present invention does not limit the specific form of a GW identifier; similarly, the GW indicator may be an indicator such as a digit, a letter, or a character string that can indicate the type of the node that sends the GW indicator. The embodiment of the present invention does not limit the specific form of a GW indicator.

Step 402: The UE is handed over from a source eNB to a target eNB through X2 handover.

Step 403: The target eNB sends a path switch request message to the MME.

Step 404: The MME sends a path switch response message to the target eNB.

Step 405: Optionally, the target eNB sends a UE context release message to the source eNB.

Step 406: Optionally, the source eNB releases a context-related resource of the UE.

Step 407: Optionally, the MME determines whether a node on a source side is a source GW and a node on a target side is a target GW, according to the pre-obtained identifiers of the nodes on the source side and on the target side corresponding to the UE and the pre-obtained corresponding relation between the GW indicator and the GW identifier.

Specifically, the MME may receive an identifier of the UE handed over to the target eNB, where the identifier of the UE is sent by the target eNB, and receive the path switch request sent by the node on the target side corresponding to the UE handed over to the target eNB; the identifier of the UE is assigned by the MME to the UE when the UE accesses a network, and is sent by the source eNB to the target eNB during X2 handover. Then, according to the identifier of the UE, the MME searches in the saved corresponding relation between the identifier of the UE and the identifier of the node on the source side corresponding to the UE to obtain the identifier of the node on the source side corresponding to the UE. In addition, according to the saved corresponding relation between the path for receiving the path switch request and the identifier of the node on the target side, the MME obtains the identifier of the node on the target side corresponding to the UE, where the nodes on the source side and on the target side corresponding to the UE are directly connected to the MME.

After obtaining the identifier of the node on the source side corresponding to the UE, the MME may search in GW identifiers saved in the MME, according to the identifier of the node on the source side. If a GW identifier that is the same as the identifier of the node on the source side is found, the MME may determine that the node on the source side is a source GW according to the GW indicator corresponding to the GW identifier. If a GW identifier that is the same as the identifier of the node on the source side is not found, the MME may determine that the node on the source side is not a source GW. Similarly, after obtaining the identifier of the node on the target side corresponding to the UE, the MME may search in GW identifiers saved in the MME, according to the identifier of the node on the target side. If a GW identifier that is the same as the identifier of the node on the target side is found, the MME may determine that the node on the target side is a target GW according to the GW indicator corresponding to the GW identifier. If a GW identifier that is the same as the identifier of the node on the target side is not found, the MME may determine that the node on the target side is not a target GW.

In this embodiment, step 407 may be performed after step 403. Step 407 may be performed before or after step 404, step 405 or step 406, or performed in parallel with step 404, step 405, or step 406, which is not limited in this embodiment.

Step 408: The MME sends a UE context release command message to the source GW, where the UE context release command message carries the identifier of the UE handed over to the target eNB.

Specifically, when the node on the source side is a source GW, the node on the target side is a target GW, and the identifier of the node on the source side is different from the identifier of the node on the target side, or when the node on the source side is a source GW and the node on the target side is not a target GW, the MME may send the UE context release command message to the source GW.

Step 409: The source GW sends the UE context release command message to the source eNB, where the UE context release command message carries an identifier of the UE handed over to the target eNB.

Step 410: Optionally, the source eNB releases the context-related resource of the UE corresponding to the identifier of the UE.

In the embodiment, step 410 is in conflict with step 406, which means that only one of steps 410 and 406 may be available in any embodiment.

Step 411: The source eNB sends a UE context release completion message to the source GW, where the UE context release completion message carries the identifier of the UE handed over to the target eNB.

Step 412: The source GW releases the context-related resource of the UE corresponding to the identifier of the UE.

Step 413: Optionally, the source GW sends the UE context release completion message to the MME.

In addition, in this embodiment, the MME may also determine whether the node on the source side is a source GW and the node on the target side is a target GW according to a TAI; Specifically, nodes of different types may be set to use different TAI sets. Before the source GW receives the UE context release command message, the MME may receive the identifier of the UE handed over to the target eNB. The identifier of the UE is sent by the target eNB, and receive the path switch request sent by the node on the target side corresponding to the UE handed over to the target eNB. The identifier of the UE is assigned by the MME to the UE when the UE accesses a network, and is sent by the source eNB to the target eNB during X2 handover. Then, according to the identifier of the UE, the MME searches in the saved corresponding relation between the identifier of the UE and the identifier of the node on the source side corresponding to the UE to obtain the identifier of the node on the source side corresponding to the UE. In addition, according to the saved corresponding relation between the path for receiving the path switch request and the identifier of the node on the target side, the MME obtains the identifier of the node on the target side corresponding to the UE, where the nodes on the source side and on the target side corresponding to the UE are directly connected to the MME.

Nodes of different types use different TAI sets. For example, the GW and the eNB that are two types of nodes may be set to use different TAI sets. In this way, after obtaining the identifier of the node on the source side corresponding to the UE, the MME may search in GW identifiers saved in the MME, according to the identifier of the node on the source side. If a GW identifier that is the same as the identifier of the node on the source side is found, the MME may determine that the node on the source side is a source GW according to the type of a node corresponding to the set to which the TAI corresponding to the GW identifier belongs. If a GW identifier that is the same as the identifier of the node on the source side is not found, the MME may determine that the node on the source side is not a source GW. Similarly, after obtaining the identifier of the node on the target side corresponding to the UE, the MME may search in GW identifiers saved in the MME, according to the identifier of the node on the target side. If a GW identifier that is the same as the identifier of the node on the target side is found, the MME may determine that the node on the target side is a target GW according to the type of a node corresponding to the set to which the TAI corresponding to the GW identifier belongs; if a GW identifier that is the same as the identifier of the node on the target side is not found, the MME may determine that the node on the target side is not a target GW.

In the embodiment, after receiving the UE context release command message which carries the identifier of the UE handed over to the target eNB and is sent by the MME, the source GW may send the UE context release command message to the source eNB and receive a UE context release completion message sent by the source eNB. Then, the source GW may release the context-related resource of the UE corresponding to the identifier of the UE handed over to the target eNB, where the identifier of the UE is carried in the UE context release completion message; as a result, the context-related resource of the UE in the source GW can be released so that a new UE may access a network successfully, and resources are saved.

Figure 5:
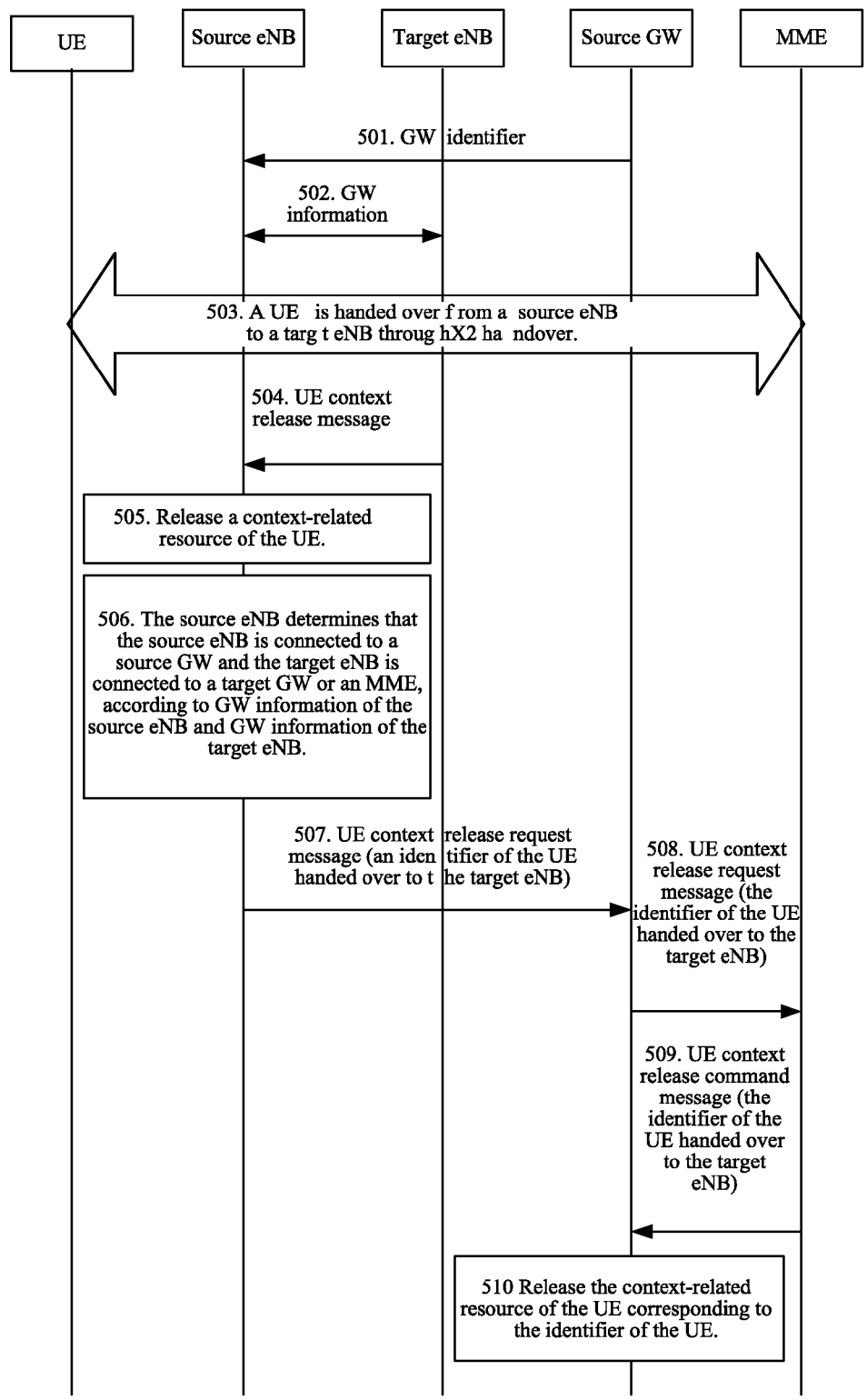
FIG. 5 is a flowchart of a method for releasing a context-related resource of a user equipment according to a fifth embodiment of the present invention.

FIG. 5 is a flowchart of a method for releasing a context-related resource of a user equipment according to a fifth embodiment of the present invention. In this embodiment, an access network node being an eNB, an intermediate node being a GW, a core network node being an MME, and a control message being a UE context release request message are used as an example for description. As shown in FIG. 5, the method for releasing the context-related resource of the user equipment may include the following steps.

Step 501: Optionally, a source GW sends a GW identifier to a source eNB.

Step 502: Optionally, the source eNB exchanges GW information with a target eNB.

Specifically, the source eNB may send the GW information of the source eNB to the target eNB and receive the GW information of the target eNB sent by the target eNB, and the GW information of the source eNB may include whether the source eNB is connected to a GW. When the source eNB is connected to a GW, the GW information of the source eNB may further include an identifier of the source GW connected to the source eNB; the GW information of the target eNB may include whether the target eNB is connected to a GW. When the target eNB is connected to a GW, the GW information of the target eNB may further include an identifier of the target GW connected to the target eNB.

Step 503: The UE is handed over from the source eNB to the target eNB through X2 handover.

Step 504: The target eNB sends a UE context release message to the source eNB.

Step 505: The source eNB releases the context-related resource of the UE.

Step 506: Optionally, the source eNB determines that the source eNB is connected to the source GW and the target eNB is connected to the target GW or the MME, according to the GW information of the source eNB and the GW information of the target eNB.

Step 507: The source GW receives a UE context release request message sent by the source eNB, where the UE context release request message carries an identifier of the UE handed over to the target eNB.

Step 508: The source GW sends the UE context release request message to the MME, where the UE context release request message carries the identifier of the UE handed over to the target eNB.

Step 509: The MME sends a UE context release command message to the source GW, where the UE context release command message carries the identifier of the UE handed over to the target eNB.

Step 510: The source GW releases the context-related resource of the UE corresponding to the identifier of the UE.

In addition, in this embodiment, the source eNB may also determine that the source eNB is connected to the source GW and the target eNB is connected to the target GW or the MME, according to tracking area identifiers (Tracking Area Identifier, hereinafter referred to as TAI) of the source GW and the target GW. Specifically, it may be specified that eNBs that are not connected to the same GW cannot share a TAI. In this way, when the eNBs that are not connected to the same GW cannot share a TAI, the source eNB may send the TAI of the source eNB to the target eNB and receive the TAI of the target eNB sent by the target eNB. The source eNB may determine that the source eNB is connected to the source GW and the target eNB is connected to the target GW or the MME, according to the TAI of the source eNB and the TAI of the target eNB. Then, the source eNB may send the UE context release request message to the source GW.

In the embodiment, after receiving the UE context release request message which carries the identifier of the UE handed over to the target eNB and is sent by the source eNB, the source GW may send the UE context release request message to the MME and receive the UE context release command message sent by the MME. Then, the source GW may release the context-related resource of the UE corresponding to the identifier of the UE handed over to the target eNB, where the identifier of the UE is carried in the UE context release command message; as a result, the context-related resource of the UE in the source GW can be released so that a new UE may access a network successfully, and resources are saved.

Figure 6:
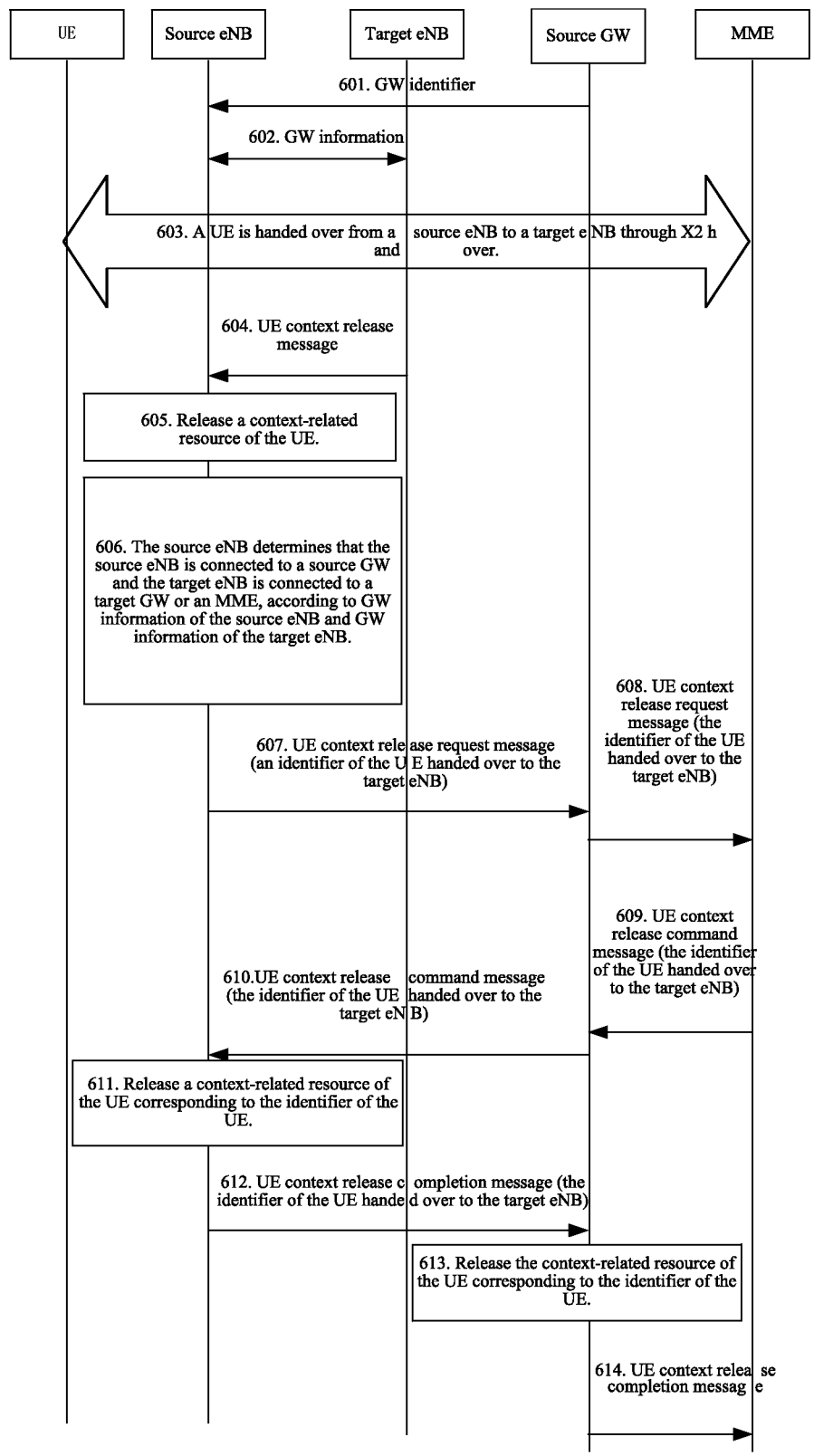
FIG. 6 is a flowchart of a method for releasing a context-related resource of a user equipment according to a sixth embodiment of the present invention.

FIG. 6 is a flowchart of a method for releasing a context-related resource of a user equipment according to a sixth embodiment of the present invention. In this embodiment, an access network node being an eNB, an intermediate node being a GW, a core network node being an MME, and a control message being a UE context release request message are used as an example for description. As shown in FIG. 6, the method for releasing the context-related resource of the user equipment may include the following steps.

Step 601: Optionally, a source GW sends a GW identifier to a source eNB.

Step 602: Optionally, the source eNB exchanges GW information with a target eNB.

Specifically, the source eNB may send the GW information of the source eNB to the target eNB and receive the GW information of the target eNB sent by the target eNB. The GW information of the source eNB may include whether the source eNB is connected to a GW. When the source eNB is connected to a GW, the GW information of the source eNB may further include an identifier of the source GW connected to the source eNB; the GW information of the target eNB may include whether the target eNB is connected to a GW. When the target eNB is connected to a GW, the GW information of the target eNB may further include an identifier of the target GW connected to the target eNB.

Step 603: The UE is handed over from the source eNB to the target eNB through X2 handover.

Step 604: The target eNB sends a UE context release message to the source eNB.

Step 605: Optionally, the source eNB releases the context-related resource of the UE.

Step 606: Optionally, the source eNB determines that the source eNB is connected to the source GW and the target eNB is connected to the target GW or the MME, according to the GW information of the source eNB and the GW information of the target eNB.

Step 607: The source GW receives a UE context release request message sent by the source eNB, where the UE context release request message carries an identifier of the UE handed over to the target eNB.

Step 608: The source GW sends the UE context release request message to the MME, where the UE context release request message carries the identifier of the UE handed over to the target eNB.

Step 609: The MME sends a UE context release command message to the source GW, where the UE context release command message carries the identifier of the UE handed over to the target eNB.

Step 610: The source GW sends the UE context release command message to the source eNB, where the UE context release command message carries the identifier of the UE handed over to the target eNB.

Step 611: Optionally, the source eNB releases the context-related resource of the UE corresponding to the identifier of the UE.

In the embodiment, step 611 is in conflict with step 605, which means that only one of steps 611 and 605 may be available in any embodiment.

Step 612: The source eNB sends a UE context release completion message to the source GW, where the UE context release command message carries the identifier of the UE handed over to the target eNB.

Step 613: The source GW releases the context-related resource of the UE corresponding to the identifier of the UE.

Step 614: Optionally, the source GW sends the UE context release completion message to the MME.

In addition, in this embodiment, the source eNB may also determine that the source eNB is connected to the source GW and the target eNB is connected to the target GW or the MME, according to tracking area identifiers (Tracking Area Identifier, hereinafter referred to as TAI) of the source GW and the target GW. Specifically, it may be specified that eNBs that are not connected to the same GW cannot share a TAI. In this way, when the eNBs that are not connected to the same GW cannot share a TAI, the source eNB may send the TAI of the source eNB to the target eNB and receive the TAI of the target eNB sent by the target eNB. The source eNB may determine that the source eNB is connected to the source GW and the target eNB is connected to the target GW or the MME, according to the TAI of the source eNB and the TAI of the target eNB. Then, the source eNB may send the UE context release request message to the source GW.

In the embodiment, after receiving the UE context release request message which carries the identifier of the UE handed over to the target eNB and is sent by the source eNB, the source GW may send the UE context release request message to the MME and receive the UE context release command message sent by the MME. Then, the source GW may send the UE context release command message to the source eNB and receive the UE context release completion message sent by the source eNB. Then, the source GW may release the context-related resource of the UE corresponding to the identifier of the UE handed over to the target eNB, where the identifier of the UE is carried in the UE context release completion message. Ss a result, the context-related resource of the UE in the source GW can be released so that a new UE may access a network successfully, and resources are saved.

Figure 7:
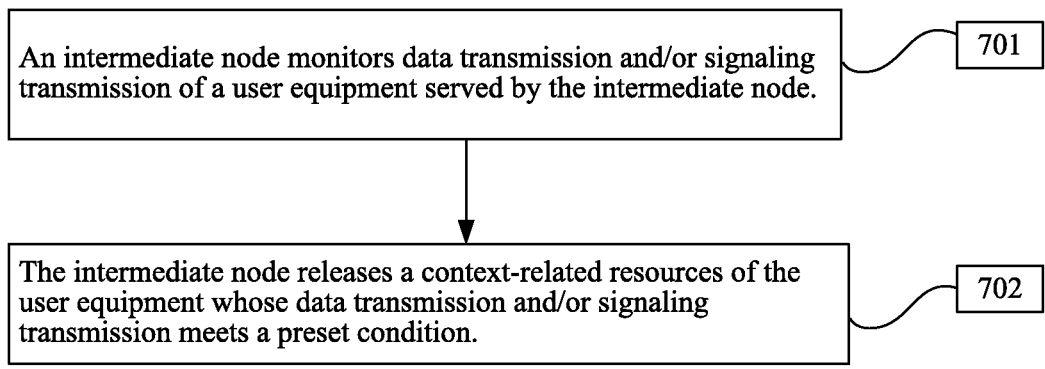
FIG. 7 is a flowchart of a method for releasing a context-related resource of a user equipment according to a seventh embodiment of the present invention.

FIG. 7 is a flowchart of a method for releasing a context-related resource of a user equipment according to a seventh embodiment of the present invention. As shown in FIG. 7, the method for releasing the context-related resource of the user equipment may include the following steps.

Step 701: An intermediate node monitors data transmission and/or signaling transmission of a user equipment served by the intermediate node.

Step 702: The intermediate node releases the context-related resource of the user equipment whose data transmission and/or signaling transmission meets a preset condition.

The preset condition may at least include that the suspension duration of the data transmission and/or signaling transmission of the user equipment exceeds a preset duration; or the intermediate node receives an end marker packet for the user equipment; or the time interval to the time at which the intermediate node receives a heartbeat data block for the user equipment at the last time exceeds a preset time interval.

In this embodiment, after the intermediate node monitors the data transmission and/or signaling transmission of the user equipment served by the intermediate node, and before the intermediate node releases the context-related resource of the user equipment whose data transmission and/or signaling transmission meets the preset condition, the intermediate node may further send a user equipment context release request message or a reset message to a core network node and receive a user equipment context release command message or reset acknowledgement message sent by the core network node. Of course, the embodiment of the present invention is not limited thereto. The intermediate node may further send other message than a user equipment context release request message and a reset message to the core network node as long as the intermediate node can release the context-related resource of the user equipment whose data transmission and/or signaling transmission meets the preset condition after the intermediate node monitors the data transmission and/or signaling transmission of the user equipment served by the intermediate node. The embodiment of the present invention does not limit the specific form of a message sent by the intermediate node to the core network node.

In this embodiment, the core network node may be a node that provides a core network function, such as a mobility management entity. The intermediate node may be a node that provides a network compatibility function, such as protocol conversion, route selection, and data exchange, between an access network node and a core network node. For example, the intermediate node may be a gateway or a DeNB. The access network node may be a node that provides an access function, for example, a base station. The base station may include an eNB. The eNB may be a common macro base station or a small base station, including a HeNB/HNB or an RN. However, the embodiment of the present invention does not limit the specific form of an access network node, an intermediate node, and a core network node.

In the embodiment, the intermediate node may monitor the data transmission and/or signaling transmission of the user equipment served by the intermediate node and release the context-related resource of the user equipment whose data transmission and/or signaling transmission meets a preset condition; as a result, the context-related resource of the user equipment in the source intermediate node can be released so that a new user equipment may access a network successfully, and resources are saved.

Figure 8:
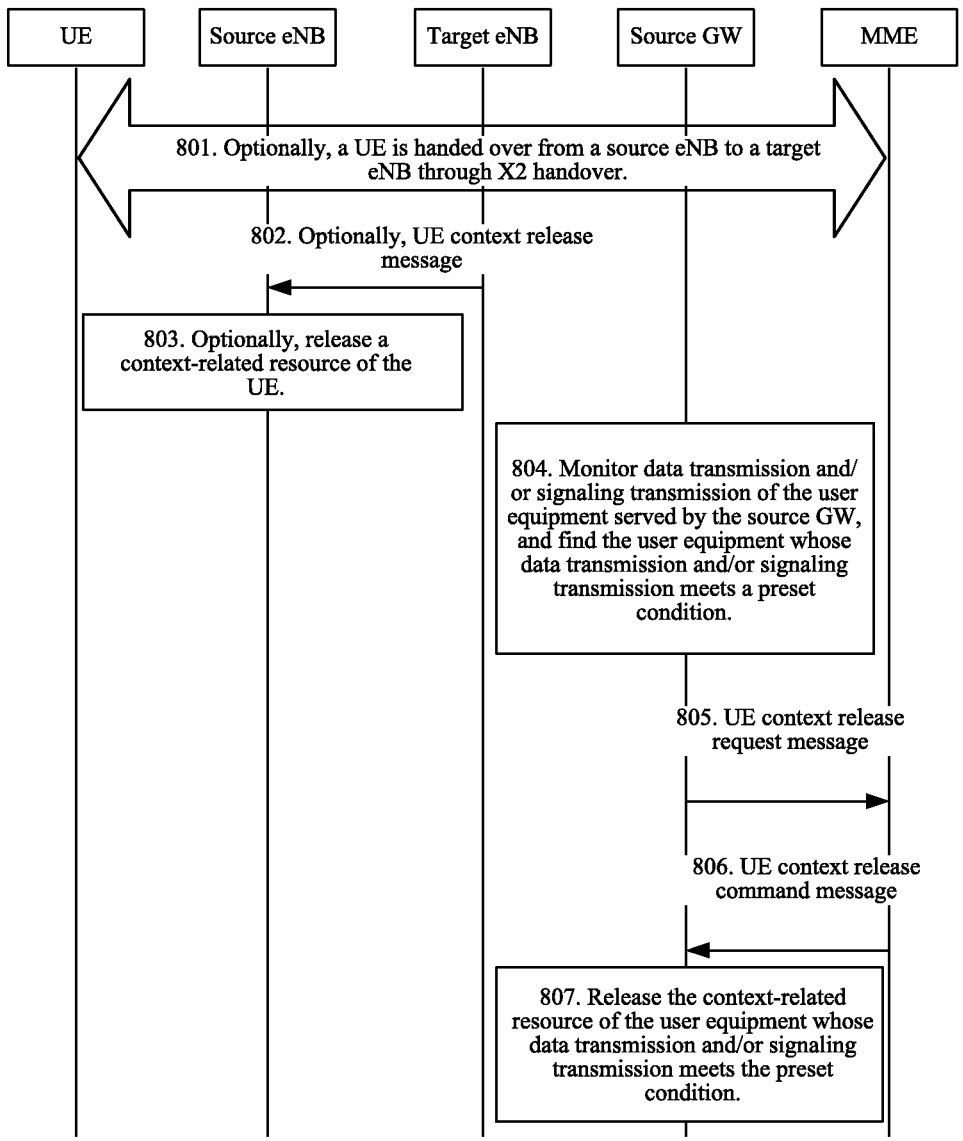
FIG. 8 is a flowchart of a method for releasing a context-related resource of a user equipment according to an eighth embodiment of the present invention.

FIG. 8 is a flowchart of a method for releasing a context-related resource of a user equipment according to an eighth embodiment of the present invention. In this embodiment, an access network node being an eNB, an intermediate node being a GW, and a core network node being an MME are used as an example for description. As shown in FIG. 8, the method for releasing the context-related resource of the user equipment may include the following steps.

Step 801: Optionally, a UE is handed over from a source eNB to a target eNB through X2 handover.

Step 802: Optionally, the target eNB sends a UE context release message to the source eNB.

Step 803: Optionally, the source eNB releases the context-related resource of the UE.

Step 804: A source GW monitors data transmission and/or signaling transmission of the user equipment served by the source GW, and finds the user equipment whose data transmission and/or signaling transmission meets a preset condition.

The preset condition may be any one or any combination of the following:

(1) The transmission suspension duration of the data and/or signaling of a UE, such as tracking area update (Tracking Area Update, hereinafter referred to as TAU) signaling, exceeds a preset duration;

(2) The source GW receives an end marker (End Marker) packet for the UE, where the end marker packet indicates that a core network does not send a packet of the UE to the source eNB afterwards; and (3) The time interval to the time at which the source GW receives a heartbeat data block (Heart Beat Chunk) for the UE at the last time exceeds a preset time interval, where the received heartbeat data block for the UE indicates that the UE is still receiving the service of the source GW.

Step 805: Optionally, the source GW sends a UE context release request message to the MME.

Step 806: Optionally, the MME sends a UE context release command message to the source GW.

Step 807: The source GW releases the context-related resource of the user equipment whose data transmission and/or signaling transmission meets the preset condition.

In addition, in step 805 of the embodiment of the present invention, the source GW may also send a reset message to the MME, and therefore, in step 806, the MME may send a reset acknowledgement message to the source GW, which is not limited in the embodiment.

In the embodiment, the source GW may monitor the data transmission and/or signaling transmission of the UE served by the source GW and release the context-related resource of the UE whose data transmission and/or signaling transmission meets a preset condition. As a result, the context-related resource of the UE in the source GW can be released so that a new UE may access a network successfully, and resources are saved.

Figure 9:
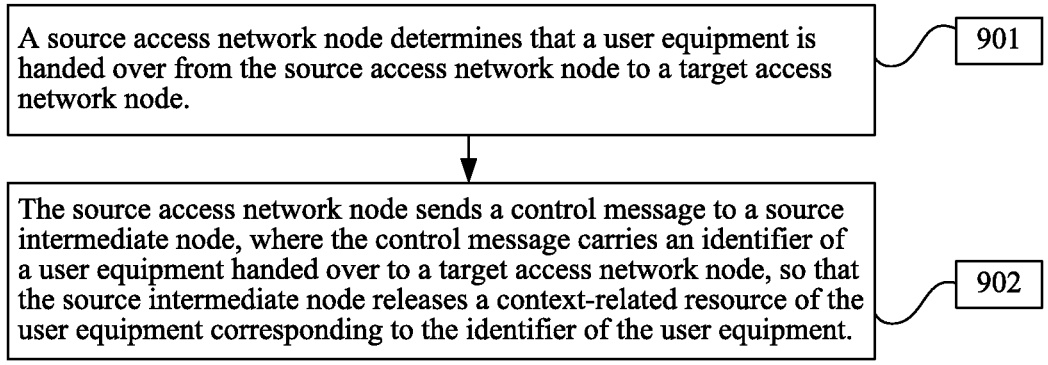
FIG. 9 is a flowchart of a method for releasing a context-related resource of a user equipment according to a ninth embodiment of the present invention.

FIG. 9 is a flowchart of a method for releasing a context-related resource of a user equipment according to a ninth embodiment of the present invention. As shown in FIG. 9, the method for releasing the context-related resource of the user equipment may include the following steps.

Step 901: A source access network node determines that a user equipment is handed over from the source access network node to a target access network node.

Step 902: The source access network node sends a control message to a source intermediate node. The control message carries an identifier of the user equipment handed over to the target access network node, so that the source intermediate node releases the context-related resource of the user equipment corresponding to the identifier of the user equipment.

In one implementation manner of this embodiment, before the source access network node determines that the user equipment is handed over from the source access network node to the target access network node, the source access network node may send intermediate node information of the source access network node to the target access network node, and receive intermediate node information of the target access network node sent by the target access network node. Then, before the source access network node sends the control message to the source intermediate node, the source access network node may determine, according to the intermediate node information of the source access network node and the intermediate node information of the target access network node, that it needs to send the control message to the source intermediate node.

Specifically, when it is determined, according to the intermediate node information of the source access network node and the intermediate node information of the target access network node, that the source access network node is connected to the source intermediate node and the target access network node is connected to a target intermediate node or a core network node, the source access network node may send the control message to the source intermediate node.

The intermediate node information of the source access network node includes whether the source access network node is connected to an intermediate node. When the source access network node is connected to an intermediate node, the intermediate node information of the source access network node further includes the identifier of the source intermediate node connected to the source access network node. The identifier of the source intermediate node may be sent by the source intermediate node to the source access network node before the source access network node sends the intermediate node information of the source access network node to the target access network node, and the intermediate node information of the target access network node includes whether the target access network node is connected to an intermediate node. When the target access network node is connected to an intermediate node, the intermediate node information of the target access network node further includes the identifier of the target intermediate node connected to the target access network node, where the identifier of the target intermediate node may be sent by the target intermediate node to the target access network node before the target access network node sends the intermediate node information of the target access network node to the source access network node.

In another implementation manner of this embodiment, before the source access network node determines that the user equipment is handed over from the source access network node to the target access network node. When the access network nodes that are not connected to the same intermediate node cannot share a tracking area identifier, the source access network node may send a tracking area identifier of the source access network node to the target access network node, and receive a tracking area identifier of the target access network node sent by the target access network node. Then, before the source access network node sends the control message to the source intermediate node, the source access network node may determine, according to the tracking area identifier of the source access network node and the tracking area identifier of the target access network node, that it needs to send the control message to the source intermediate node.

Specifically, when the source access network node determines, according to the tracking area identifier of the source access network node and the tracking area identifier of the target access network node, that the source access network node is connected to the source intermediate node and the target access network node is connected to the target intermediate node or the core network node, the source access network node may send the control message to the source intermediate node.

However, the embodiment of the present invention is not limited to the above two implementation manners. The source access network node may also determine whether it needs to send the control message to the source intermediate node by other judgment criteria, which is not limited in this embodiment.

In the preceding embodiment, after the source access network node determines that the user equipment is handed over from the source access network node to the target access network node, the source access network node may send, to the source intermediate node, the control message carrying the identifier of the user equipment handed over to the target access network node. In this way, after receiving the control message, the source intermediate node may release the context-related resource of the user equipment corresponding to the identifier of the user equipment. As a result, the context-related resource of the user equipment in the source intermediate node can be released, so that a new user equipment may access a network successfully, and resources are saved.

Figure 10:
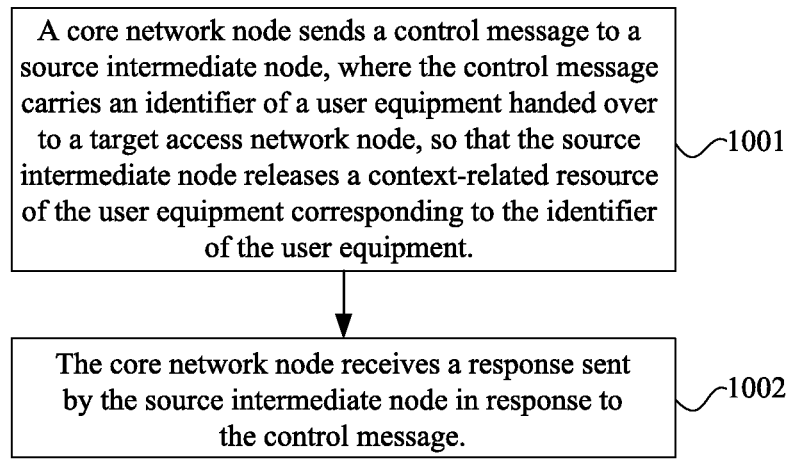
FIG. 10 is a flowchart of a method for releasing a context-related resource of a user equipment according to a tenth embodiment of the present invention.

FIG. 10 is a flowchart of a method for releasing a context-related resource of a user equipment according to a tenth embodiment of the present invention. As shown in FIG. 10, the method for releasing the context-related resource of the user equipment may include the following steps.

Step 1001: A core network node sends a control message to a source intermediate node, where the control message carries an identifier of a user equipment handed over to a target access network node, so that the source intermediate node releases the context-related resource of the user equipment corresponding to the identifier of the user equipment.

Step 1002: The core network node receives a response sent by the source intermediate node in response to the control message.

In one implementation manner of this embodiment, before the core network node sends a control message to the source intermediate node, the core network node may receive and save an intermediate node identifier of an intermediate node and an intermediate node indicator corresponding to the intermediate node identifier which are sent by the intermediate node. The intermediate node indicator indicates that the type of the node that sends the intermediate node indicator is an intermediate node. The intermediate node identifier uniquely identifies one intermediate node in a network. In this case, the core network node determines that it needs to send the control message to the source intermediate node, according to the pre-obtained identifiers of nodes on a source side and on a target side corresponding to the user equipment and the pre-obtained corresponding relation between the intermediate node indicator and the intermediate node identifier.

Specifically, before sending the control message to the source intermediate node, the core network node may receive the identifier of the user equipment handed over to the target access network node. The identifier of the user equipment is sent by the target access network node. The core network node may receive a path switch request sent by a node on the target side corresponding to the user equipment handed over to the target access network node. The identifier of the user equipment is assigned by the core network node to the user equipment when the user equipment accesses a network, and is sent by a source access network node to a target access network node during X2 handover. Then, according to the identifier of the user equipment, the core network node searches in the saved corresponding relation between the identifier of the user equipment and the identifier of a node on the source side corresponding to the user equipment to obtain the identifier of the node on the source side corresponding to the user equipment. In addition, according to the saved corresponding relation between the path for receiving the path switch request and the identifier of the node on the target side, the core network node obtains the identifier of the node on the target side corresponding to the user equipment. The nodes on the source side and on the target side corresponding to the user equipment are directly connected to the core network node.

After obtaining the identifier of the node on the source side corresponding to the user equipment, the core network node may search in intermediate node identifiers saved in the core network node, according to the identifier of the node on the source side. If an intermediate node identifier that is the same as the identifier of the node on the source side is found, the core network node may determine that the node on the source side is a source intermediate node according to the intermediate node indicator corresponding to the intermediate node identifier. If an intermediate node identifier that is the same as the identifier of the node on the source side is not found, the core network node may determine that the node on the source side is not a source intermediate node. Similarly, after obtaining the identifier of the node on the target side corresponding to the user equipment, the core network node may search in intermediate node identifiers saved in the core network node, according to the identifier of the node on the target side. If an intermediate node identifier that is the same as the identifier of the node on the target side is found, the core network node may determine that the node on the target side is a target intermediate node according to the intermediate node indicator corresponding to the intermediate node identifier. If an intermediate node identifier that is the same as the identifier of the node on the target side is not found, the core network node may determine that the node on the target side is not a target intermediate node.

In another implementation manner of this embodiment, before the core network node sends the control message to the source intermediate node, the core network node may receive and save the intermediate node identifier and a tracking area identifier corresponding to the intermediate node identifier which are sent by an intermediate node. The type of a node corresponding to the set to which the tracking area identifier sent by the intermediate node belongs is an intermediate node. The intermediate node identifier uniquely identifies one intermediate node in a network. In this case, the core network node may determine that it needs to send the control message to the source intermediate node, according to the pre-obtained identifiers of the nodes on the source side and on the target side corresponding to the user equipment and the pre-obtained corresponding relation between the tracking area identifier and the intermediate node identifier.

Specifically, before sending the control message to the source intermediate node, the core network node may receive the identifier of the user equipment handed over to the target access network node. The identifier of the user equipment is sent by the target access network node. The source intermediate node may receive the path switch request sent by the node on the target side corresponding to the user equipment handed over to the target access network node; the identifier of the user equipment is assigned by the core network node to the user equipment when the user equipment accesses a network, and is sent by the source access network node to the target access network node during X2 handover. Then, according to the identifier of the user equipment, the core network node searches in the saved corresponding relation between the identifier of the user equipment and the identifier of the node on the source side corresponding to the user equipment to obtain the identifier of the node on the source side corresponding to the user equipment. In addition, according to the saved corresponding relation between the path for receiving the path switch request and the identifier of the node on the target side, the core network node obtains the identifier of the node on the target side corresponding to the user equipment. The nodes on the source side and on the target side corresponding to the user equipment are directly connected to the core network node.

In this implementation manner, nodes of different types may be set to use different tracking area identifier sets. For example, the intermediate node and the access network node that are two types of nodes may be set to use different tracking area identifier sets. In this way, after obtaining the identifier of the node on the source side corresponding to the user equipment, the core network node may search in intermediate node identifiers saved in the core network node, according to the identifier of the node on the source side. If an intermediate node identifier that is the same as the identifier of the node on the source side is found, the core network node may determine that the node on the source side is a source intermediate node according to the type of a node corresponding to the set to which the tracking area identifier corresponding to the intermediate node identifier belongs. If an intermediate node identifier that is the same as the identifier of the node on the source side is not found, the core network node may determine that the node on the source side is not a source intermediate node. Similarly, after obtaining the identifier of the node on the target side corresponding to the user equipment, the core network node may search in intermediate node identifiers saved in the core network node, according to the identifier of the node on the target side. If an intermediate node identifier that is the same as the identifier of the node on the target side is found, the core network node may determine that the node on the target side is a target intermediate node according to the type of a node corresponding to the set to which the tracking area identifier corresponding to the intermediate node identifier belongs. If an intermediate node identifier that is the same as the identifier of the node on the target side is not found, the core network node may determine that the node on the target side is not a target intermediate node.

In the embodiment, when it is determined by the preceding two implementation manners that the node on the source side is a source intermediate node, the node on the target side is a target intermediate node, and the identifier of the node on the source side is different from the identifier of the node on the target side. When it is determined that the node on the source side is a source intermediate node and the node on the target side is not a target intermediate node, the core network node may send the control message to the source intermediate node. However, the embodiment of the present invention is not limited hitherto, and the core network node may determine whether it needs to send the control message to the source intermediate node by other judgment criteria, which is not limited in this embodiment.

In the preceding embodiment, the core network node sends, to the source intermediate node, the control message carrying the identifier of the user equipment handed over to the target access network node. After receiving the control message, the source intermediate node may release the context-related resource of the user equipment corresponding to the identifier of the user equipment. As a result, the context-related resource of the user equipment in the source intermediate node can be released, so that a new user equipment may access a network successfully, and resources are saved.

A person of ordinary skill in the art should understand that, all or part of the steps of the method embodiments may be implemented by a program instructing relevant hardware. The program may be stored in a computer readable storage medium. When the program runs, the steps in the method embodiments are performed. The storage medium may be any medium capable of storing program codes, such as a ROM, a RAM, a magnetic disk, or an optical disk.

Figure 11:
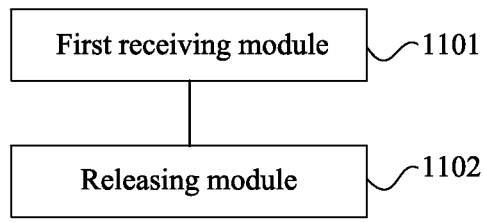
FIG. 11 is a structural schematic diagram of an intermediate node device according to a first embodiment of the present invention.

FIG. 11 is a structural schematic diagram of an intermediate node device according to a first embodiment of the present invention. In the embodiment, the intermediate node device may implement the process of the embodiment of the present invention shown in FIG. 1. As shown in FIG. 11, the intermediate node device may include a first receiving module 1101 and a releasing module 1102. The first receiving module 1101 is configured to receive a control message. The control message carries an identifier of a user equipment handed over to a target access network node device. the releasing module 1102 is configured to release a context-related resource of the user equipment corresponding to the identifier of the user equipment according to the identifier of the user equipment carried in the control message received by the first receiving module 1101.

The intermediate node device in the embodiment may be a node device that provides a network compatibility function, such as protocol conversion, route selection, and data exchange, between an access network node device and a core network node device, for example, a gateway or a DeNB. However, the embodiment of the present invention does not limit the specific form of an intermediate node device.

The control message in the embodiment may be a user equipment context release request message, a user equipment context release command message, or a reset message. The embodiment of the present invention is not limited thereto. The embodiment of the present invention does not limit the specific form of a control message. The control massage may be other message than a user equipment context release request message, a user equipment context release command message, and a reset message as long as a source intermediate node may release the context-related resource of the corresponding user equipment, according to the identifier of the user equipment handed over to the target access network node carried in the control message.

In the intermediate node device, after the first receiving module 1101 receives the control message carrying the identifier of the user equipment handed over to the target access network node, the releasing module 1102 releases the context-related resource of the user equipment corresponding to the identifier of the user equipment. As a result, the context-related resource of the user equipment in a source intermediate node device can be released, so that a new user equipment may access a network successfully and resources are saved.

Figure 12:
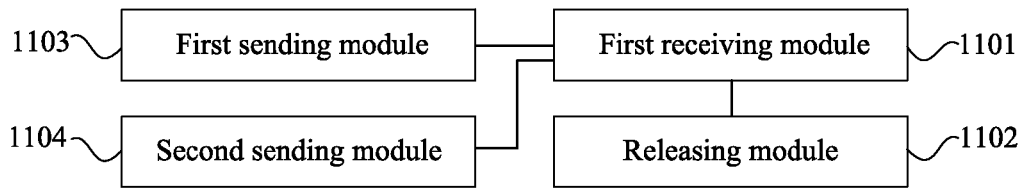
FIG. 12 is a structural schematic diagram of an intermediate node device according to a second embodiment of the present invention.

FIG. 12 is a structural schematic diagram of an intermediate node device according to a second embodiment of the present invention. Compared with the intermediate node device shown in FIG. 11, the difference lies in that in one implementation manner, in the intermediate node device shown in FIG. 12, a control message received by the first receiving module 1101 may be a user equipment context release request message or reset message sent by a source access network node device.

Furthermore, the intermediate node device in this implementation manner may further include a first sending module 1103 which is configured to send a user equipment context release request message or reset message received by the first receiving module 1101 to a core network node device. In this case, the first receiving module 1101 may further receive a user equipment context release command message or reset acknowledgement message sent by the core network node device.

In this implementation manner, the first sending module 1103 may further send the received user equipment context release command message or reset acknowledgement message to the source access network node device; the first receiving module 1101 may further receive a user equipment context release completion message or reset acknowledgement message sent by the source access network node device. Furthermore, the first sending module 1103 may further send the user equipment context release completion message or reset acknowledgement message received by the first receiving module 1101 to the core network node device.

In another implementation manner of the embodiment, the control message received by the first receiving module 1101 may be a user equipment context release command message or reset message sent by the core network node device.

Furthermore, the intermediate node device in this implementation manner may further include a second sending module 1104, which is configured to send the user equipment context release command message or reset message received by the first receiving module 1101 to the source access network node device. In this case, the first receiving module 1101 may further receive the user equipment context release completion message or reset acknowledgement message sent by the source access network node device. Furthermore, the second sending module 1104 may further send the user equipment context release completion message or reset acknowledgement message received by the first receiving module 1101 to the core network node device.

The intermediate node device may release a context-related resource of the user equipment in a source intermediate node device, so that a new user equipment may access a network successfully and resources are saved.

Figure 13:
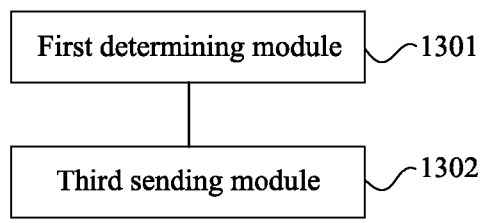
FIG. 13 is a structural schematic diagram of a source access network node device according to a first embodiment of the present invention.

FIG. 13 is a structural schematic diagram of a source access network node device according to a first embodiment of the present invention. As shown in FIG. 13, the source access network node device may include a first determining module 1301 and a third sending module 1302. The first determining module 1301 is configured to determine that a user equipment is handed over from a source access network node to a target access network node. The third sending module 1302 is configured to send a control message to a source intermediate node device. The control message carries an identifier of the user equipment handed over to a target access network node device after the first determining module 1301 determines that the user equipment is handed over from the source access network node to the target access network node, so that the source intermediate node device releases a context-related resource of the user equipment corresponding to the identifier of the user equipment.

The source access network node device in this embodiment may be a node device that provides an access function, such as a base station. The base station may include an eNB. The eNB may be a common macro base station or a small base station, including a HeNB/HNB or an RN. However, the embodiment of the present invention does not limit the specific form of a source access network node device.

The control message in the embodiment may be a user equipment context release request message or a reset message. The embodiment of the present invention is not limited thereto. The embodiment of the present invention does not limit the specific form of a control message. The control massage may be other message than a user equipment context release request message and a reset message, as long as a source intermediate node may release the context-related resource of the corresponding user equipment according to the identifier of the user equipment handed over to the target access network node carried in the control message.

The source access network node device may release the context-related resource of the user equipment in the source intermediate node device, so that a new user equipment may access a network successfully and resources are saved.

Figure 14:
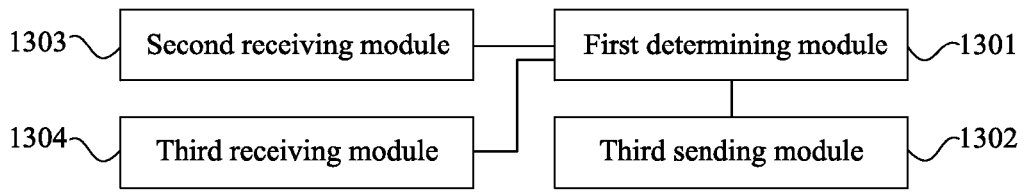
FIG. 14 is a structural schematic diagram of a source access network node device according to a second embodiment of the present invention.

FIG. 14 is a structural schematic diagram of a source access network node device according to a second embodiment of the present invention. Compared with the source access network node device shown in FIG. 13, the difference lies in that the source access network node device shown in FIG. 14 may further include a second receiving module 1303. The third sending module 1302 is further configured to send intermediate node information of the source access network node device to a target access network node device. The second receiving module 1303 is configured to receive intermediate node information of a target access network node device sent by the target access network node device. In this case, the first determining module 1301 may further determine that the third sending module 1302 is required to send a control message to a source intermediate node device, according to the intermediate node information of the source access network node device and the intermediate node information of the target access network node device received by the second receiving module 1303.

Furthermore, the source access network node device in the embodiment may further include a third receiving module 1304. The third sending module 1302 may further send a tracking area identifier of the source access network node device to the target access network node device when the access network node devices that are not connected to the same intermediate node device cannot share a tracking area identifier. Then, the third receiving module 1304 may receive a tracking area identifier of the target access network node device sent by the target access network node device. In this case, the first determining module 1301 may further determine that the third sending module 1302 is required to send the control message to the source intermediate node device, according to the tracking area identifier of the target access network node device that is received by the third receiving module 1304 and the tracking area identifier of the source access network node device.

The source access network node device may release a context-related resource of the user equipment in the source intermediate node device, so that a new user equipment may access a network successfully, and resources are saved.

Figure 15:
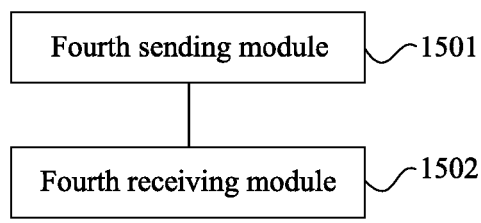
FIG. 15 is a structural schematic diagram of a core network node device according to a first embodiment of the present invention.

FIG. 15 is a structural schematic diagram of a core network node device according to a first embodiment of the present invention. As shown in FIG. 15, the core network node device may include: a fourth sending module 1501 and a fourth receiving module 1502.

The fourth sending module 1501 is configured to send a control message to a source intermediate node device. The control message carries an identifier of a user equipment handed over to a target access network node device, so that the source intermediate node device releases a context-related resource of the user equipment corresponding to the identifier of the user equipment. The fourth receiving module 1502 is configured to receive a response sent by the source intermediate node device in response to the control message.

The control message in the embodiment may be a user equipment context release command message or a reset message. However, the embodiment of the present invention is not limited thereto. The embodiment of the present invention does not limit the specific form of a control message. The control massage may be other message than a user equipment context release command message and a reset message as long as a source intermediate node may release the context-related resource of the corresponding user equipment according to the identifier of the user equipment handed over to the target access network node carried in the control message.

The core network node device in the embodiment may be a node device that provides a core network function, such as a mobility management entity. The embodiment of the present invention does not limit the specific form of a core network node device.

The core network node device may release the context-related resource of the user equipment in the source intermediate node device, so that a new user equipment may access a network smoothly, and resources are saved.

Figure 16:
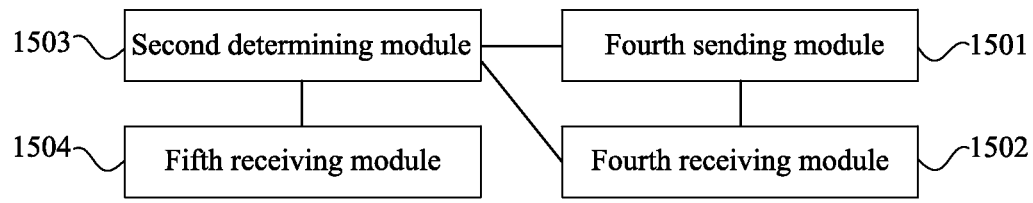
FIG. 16 is a structural schematic diagram of a core network node device according to a second embodiment of the present invention.

FIG. 16 is a structural schematic diagram of a core network node device according to a second embodiment of the present invention. Compared with the core network node device shown in FIG. 15, the difference lies in that in one implementation manner of this embodiment, the core network node device shown in FIG. 16 may further include a second determining module 1503. In the embodiment, the fourth receiving module 1502 may further receive and save an intermediate node identifier of an intermediate node device and an intermediate node indicator corresponding to the intermediate node identifier which are sent by the intermediate node device. The intermediate node indicator indicates that the type of a node device that sends the intermediate node indicator is an intermediate node device. The intermediate node identifier uniquely identifies one intermediate node device in a network.

The second determining module 1503 may determine that the fourth sending module 1501 is required to send a control message to a source intermediate node device, according to the pre-obtained identifiers of node devices on a source side and on a target side corresponding to the user equipment and the pre-obtained corresponding relation between the intermediate node indicator and the intermediate node identifier. The specific determining method is described in the embodiment of the present invention shown in FIG. 10, and details are not described herein again.

In another implementation manner of the embodiment, the core network node device shown in FIG. 16 may further include a fifth receiving module 1504, which is configured to receive and save the intermediate node identifier and a tracking area identifier corresponding to the intermediate node identifier which are sent by the intermediate node device. The type of a node device corresponding to the set to which the tracking area identifier sent by the intermediate node device belongs is an intermediate node device. The intermediate node identifier uniquely identifies one intermediate node device in a network.

The second determining module 1503 may further determine that the fourth sending module 1501 is required to send a control message to the source intermediate node device, according to the pre-obtained identifiers of the node devices on the source side and on the target side corresponding to the user equipment and the pre-obtained corresponding relation between the tracking area identifier and the intermediate node identifier. The specific determining method is described in the embodiment of the present invention shown in FIG. 10, and details are not described herein again.

The core network node device may release a context-related resource of the user equipment in the source intermediate node device, so that a new user equipment may access a network successfully and resources are saved.

Figure 17:
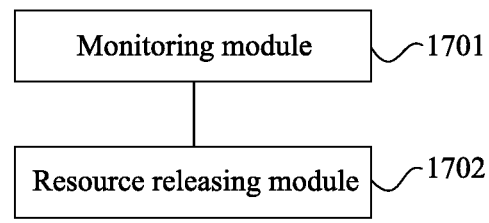
FIG. 17 is a structural schematic diagram of an intermediate node device according to a third embodiment of the present invention.

FIG. 17 is a structural schematic diagram of an intermediate node device according to a third embodiment of the present invention. In the embodiment, the intermediate node device may implement the process of the embodiment of the present invention shown in FIG. 7. As shown in FIG. 17, the intermediate node device may include a monitoring module 1701 and a resource releasing module 1702. The monitoring module 1701 is configured to monitor data transmission and/or signaling transmission of a user equipment under the intermediate node device. The resource releasing module 1702 is configured to release a context-related resource of the user equipment whose data transmission and/or signaling transmission monitored by the monitoring module 1701 meets a preset condition.

The intermediate node device in the embodiment may be a node device that provides a network compatibility function, such as protocol conversion, route selection, and data exchange, between an access network node device and a core network node device, for example, a gateway or a DeNB. However, the embodiment of the present invention does not limit the specific form of an intermediate node device.

In the intermediate node device, the monitoring module 1701 may monitor the data transmission and/or signaling transmission of the user equipment served by the intermediate node device. The resource releasing module 1702 may release the context-related resource of the user equipment whose data transmission and/or signaling transmission meets a preset condition; as a result, the context-related resource of the user equipment in the source intermediate node device can be released, so that a new user equipment may access a network successfully and resources are saved.

Figure 18:
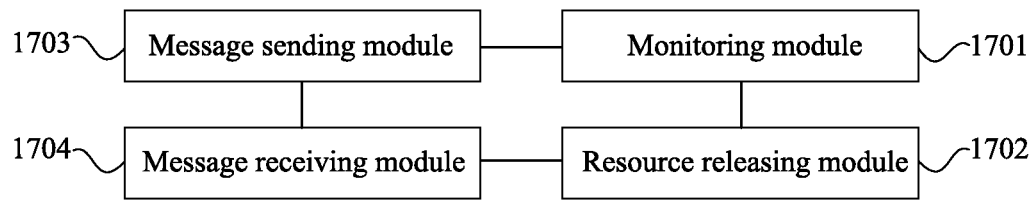
FIG. 18 is a structural schematic diagram of an intermediate node device according to a fourth embodiment of the present invention.

FIG. 18 is a structural schematic diagram of an intermediate node device according to a fourth embodiment of the present invention. Compared with the intermediate node device shown in FIG. 17, the difference lies in that the intermediate node device shown in FIG. 18 may further include a message sending module 1703, which is configured to send a user equipment context release request message or a reset message to a core network node device. Specifically, the message sending module 1703 may send the user equipment context release request message or the reset message to the core network node device after the monitoring module 1701 monitors the data transmission and/or signaling transmission of the user equipment under the intermediate node device and before the resource releasing module 1702 releases the context-related resource of the user equipment whose data transmission and/or signaling transmission meets the preset condition. A message receiving module 1704 is configured to receive the user equipment context release command message or reset acknowledgement message sent by the core network node device. In the embodiment, after the message receiving module 1704 receives the user equipment context release command message or reset acknowledgement message sent by the core network node device, the resource releasing module 1702 may release the context-related resource of the user equipment whose data transmission and/or signaling transmission meets the preset condition.

Of course, the embodiment of the present invention is not limited thereto. The message sending module 1703 may also send, to the core network node device, other message than a user equipment context release request message and a reset message as long as the resource releasing module 1702 may release the context-related resource of the user equipment whose data transmission and/or signaling transmission meets the preset condition after the monitoring module 1701 monitors the data transmission and/or signaling transmission of the user equipment served by the intermediate node. The embodiment of the present invention does not limit the specific form of a message sent by the message sending module 1703 to a core network node.

The intermediate node device may release the context-related resource of the user equipment in the source intermediate node device, so that a new user equipment may access a network successfully, and resources are saved.

It should be understood by a person skilled in the art that the accompanying drawings are merely schematic diagrams of an exemplary embodiment, and modules or processes in the accompanying drawings are not necessarily required in implementing the present invention.

A person skilled in the art may understand that modules in the devices provided in an embodiment may be arranged in the devices in a distributed manner according to the description of the embodiment, or may be arranged in one or more devices which are different from those described in the embodiment. The modules in the embodiment may be combined into one module, or split into a plurality of sub-modules.

Finally, it should be noted that the embodiments are merely intended for describing the technical solutions of the present invention other than limiting the present invention. Although the present invention is described in detail with reference to the embodiments, a person of ordinary skill in the art should understand that they may still make modifications to the technical solution described in the embodiments or make equivalent replacements to some technical features thereof; without departing from the idea and scope of the technical solution of the embodiments of the present invention.

What is claimed is:

1. A method for releasing a context-related resource of a user equipment, the method comprising:
   receiving, by a source intermediate node, a user equipment context release request message from a source access network node, wherein the user equipment context release request message carries an identifier of a user equipment, the source intermediate node is a node between the source access network node and a core network node and is a gateway node, and the core network node is a mobility management entity (MME); and
   releasing, by the gateway node in response to the user equipment context release request message being received from the source access network node, a context-related resource of the user equipment corresponding to the identifier of the user equipment, wherein the released context-related resource is released further in response to initiation of a hand over of the UE to a target access network node through an X2 interface between the source access network node and the target access network node.

2. The method according to claim 1, wherein, before the releasing the method further comprises:
   sending, by the source intermediate node, the user equipment context release request message to the core network node; and
   receiving, by the source intermediate node, a user equipment context release command message from the core network node.

3. The method according to claim 2, wherein, after receiving, of the user equipment context release command message and before the releasing, the method further comprises:
   sending, by the source intermediate node, the user equipment context release command message to the source access network node; and
   receiving, by the source intermediate node, a user equipment context release completion message from the source access network node.

4. The method according to claim 3, wherein, after the releasing, the method further comprises:
   sending, by the source intermediate node, the user equipment context release completion message from the source access network node to the core network node.

5. The method according to claim 1, wherein the user equipment context release request message further carries a terminating identifier and the terminating identifier indicates that the source intermediate node does not need to send the user equipment context release request message to the core network node.

6. An intermediate node device between a source access network node device and a core network node device, the intermediate node device comprising:
   a receiver,
   a transmitter, and
   a processor coupled with the receiver and the transmitter, wherein
      the receiver is configured to receive a user equipment context release request message from the source access network node device, wherein the user equipment context release request message from a source access network node device carries an identifier of a user equipment; and
      the processor is configured to, in response to the user equipment context release request message being received from the source access network node, release a context-related resource of the user equipment corresponding to the identifier of the user equipment, wherein the released context-related resource is released further in response to initiation of a hand over of the UE to a target access network node through an X2 interface between the source access network node and the target access network node;
   wherein the intermediate node device is a gateway node, and the core network node is a mobility management entity (MME).

7. The intermediate node device according to claim 6, wherein
   the transmitter is configured to send, to the core network node device, the user equipment context release request message; and
   the receiver is further configured to receive a user equipment context release command message from the core network node device.

8. The intermediate node device according to claim 7, wherein the transmitter is further configured to send, to the source access network node device,
   the user equipment context release command message; and
   the receiver is further configured to receive a user equipment context release completion message-from the source access network node device.

9. The intermediate node device according to claim 8, wherein
   the transmitter is further configured to send, to the core network node device, the user equipment context release completion message.

10. The intermediate node device according to claim 6, wherein the user equipment context release request message further carries a terminating identifier and the terminating identifier indicates that the user equipment context release request message does not need to be sent to the core network node device.

11. An apparatus operable to be used in an intermediate node device between a source access network node device and a core network node device, the apparatus comprising:
   a storage medium including executable instructions; and
   a processor;
   wherein the executable instructions, when executed by the processor, cause the apparatus to:
      receive a user equipment context release request message from the source access network node device, wherein the user equipment context release request message carries an identifier of a user equipment; and
      release a context-related resource of the user equipment corresponding to the identifier of the user equipment in response to the user equipment context release request message being received from the source access network node device, wherein the released context-related resource is released further in response to initiation of a hand over of the UE to a target access network node through an X2 interface between the source access network node and the target access network node; and
   wherein the intermediate node device is a gateway node, the core network node is a mobility management entity (MME).

12. The apparatus according to claim 11, wherein the executable instructions, when executed by the processor, further cause the apparatus to
- send, to the core network node device, the user equipment context release request message; and
- receive a user equipment context release command message from the core network node device.

13. The apparatus according to claim 12, wherein the executable instructions, when executed by the processor, further cause the apparatus to
- send, to the source access network node device, the user equipment context release command message; and
- receive a user equipment context release completion message from the source access network node device.

14. The apparatus according to claim 13, wherein the executable instructions, when executed by the processor, further cause the apparatus to
- send, to the core network node device, the user equipment context release completion message.

15. The apparatus according to claim 11, wherein the user equipment context release request message further carries a terminating identifier and the terminating identifier indicates that the user equipment context release request message does not need to be sent to the core network node device.

* * * * *